US012725330B2

(12) United States Patent
Oh

(10) Patent No.: US 12,725,330 B2
(45) **Date of Patent: *Sep. 1, 2026**

(54) MODIFYING GARMENT DESIGN USING STYLE LINE

(71) Applicant: CLO Virtual Fashion Inc., Seoul (KR)

(72) Inventor: Seung Woo Oh, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 309 days.

This patent is subject to a terminal disclaimer.

(21) Appl. No.: 18/503,103

(22) Filed: Nov. 6, 2023

(65) Prior Publication Data

US 2024/0070805 A1 Feb. 29, 2024

Related U.S. Application Data

(63) Continuation-in-part of application No. PCT/KR2022/006528, filed on May 9, 2022.

(30) Foreign Application Priority Data

May 12, 2021 (KR) ........................ 10-2021-0061436
May 4, 2022 (KR) ........................ 10-2022-0055126

(51) Int. Cl.

| | |
|---|---|
| ***A41H 3/00*** | (2006.01) |
| ***G06T 3/40*** | (2024.01) |
| *G06T 15/10* | (2011.01) |

(52) U.S. Cl.

CPC ............... *A41H 3/007* (2013.01); *G06T 3/40* (2013.01); *G06T 15/10* (2013.01)

(58) Field of Classification Search

None

See application file for complete search history.

(56) References Cited

U.S. PATENT DOCUMENTS 5,107,444 A * 4/1992 Wu ......................... G06T 17/20 345/419
7,516,556 B2 * 4/2009 Yepes Segovia ...... A41H 3/007 33/17 A (Continued)

FOREIGN PATENT DOCUMENTS

CN 102332180 A 1/2012
CN 104933757 A 9/2015

(Continued)

OTHER PUBLICATIONS

PCT International Search Report of PCT/KR2022/006528 mailed Aug. 5, 2022 by Korea Patent Office.

(Continued)

*Primary Examiner* — Grace Huang

(74) *Attorney, Agent, or Firm* — WTA IP Law P.C.

(57) ABSTRACT

Embodiments relate to simulating a garment according to an exemplary embodiment that receives an input of changing at least one style line of a plurality of style lines representing at least one of a style and a silhouette of a 3D garment through a user interface expressing the 3D garment, identifies at least one first smooth line linked throughout at least one 2D pattern in response to the style line among a plurality of lines included in the 2D patterns corresponding to the 3D garment, transforms the first smooth line based on the input, propagates the transformation of the first smooth line to at least one candidate line associated with the first smooth line to transform at least one 2D pattern, and outputs at least one of the transformed 2D pattern and a 3D garment in which the style line is changed in response to the transformed 2D pattern.

19 Claims, 19 Drawing Sheets

(56) References Cited

U.S. PATENT DOCUMENTS

| | | | | |
|---|---|---|---|---|
| 10,636,206 | B2 * | 4/2020 | Chen | G06T 17/20 |
| 10,789,774 | B2 * | 9/2020 | Oh | G06T 17/205 |
| 11,151,786 | B2 * | 10/2021 | Oh | G06T 17/20 |
| 11,308,707 | B2 * | 4/2022 | Oh | G06T 19/20 |
| 11,461,967 | B2 * | 10/2022 | Lee | G06T 19/00 |
| 11,523,649 | B2 * | 12/2022 | Vanroose | G05B 19/4155 |
| 11,922,577 | B2 * | 3/2024 | Kang | G06T 17/20 |
| 11,986,038 | B2 * | 5/2024 | Park | A41H 3/007 |
| 12,102,152 | B2 * | 10/2024 | Oh | G06F 30/12 |
| 12,376,638 | B2 * | 8/2025 | Ham | A41H 3/007 |
| 2001/0026272 | A1 * | 10/2001 | Feld | A41H 3/007 345/585 |
| 2005/0131571 | A1 * | 6/2005 | Costin | G06Q 30/0601 705/26.1 |
| 2013/0057544 | A1 | 3/2013 | Oh | |
| 2014/0114620 | A1 * | 4/2014 | Grinspun | A41H 3/007 703/1 |
| 2020/0372724 | A1 | 11/2020 | Jeon | |
| 2021/0217214 | A1 | 7/2021 | Lee et al. | |
| 2021/0217237 | A1 | 7/2021 | Lee et al. | |
| 2021/0311559 | A1 | 10/2021 | Rose et al. | |

FOREIGN PATENT DOCUMENTS

| | | | |
|---|---|---|---|
| CN | 110335347 | A | 10/2019 |
| CN | 112084670 | A | 12/2020 |
| CN | 112329092 | A | 2/2021 |
| CN | 112700549 | A | 4/2021 |
| EP | 2458561 | A2 | 5/2021 |
| KR | 10-2011-0119260 | A | 11/2011 |
| KR | 10-2019-0114675 | A | 10/2019 |
| KR | 10-2020-0012044 | A | 2/2020 |
| KR | 10-2021-0021929 | A | 3/2021 |
| KR | 10-2244129 | B1 | 4/2021 |
| WO | WO 2019/021349 | A1 | 1/2019 |

OTHER PUBLICATIONS

Extended European Search Report of the corresponding European application No. 22807730.1 mailed on Feb. 7, 2025.

* cited by examiner

Pilar-sewn SLL in 3D

MODIFYING GARMENT DESIGN USING STYLE LINE

CROSS-REFERENCE TO RELATED APPLICATIONS

This application is a bypass continuation-in-part application of International PCT Application No. PCT/KR2022/006528 filed on May 9, 2022, which claims priority to Republic of Korea patent application No. 10-2021-0061436, filed on May 12, 2021 and Republic of Korea patent application No. 10-2022-0055126, filed on May 4, 2022, which are incorporated by reference in their entirety.

TECHNICAL FIELD

Embodiments relate to designing of a garment, and more specifically to modifying a digital design of a garment by using an intuitive user interface that includes style lines of the garment.

BACKGROUND ART

The garment appears three-dimensional when worn by a person. However, the garment is a combination of fabric pieces cut according to a two-dimensional pattern, and hence, the garment is more of two-dimensional articles. The fabric constituting the garment is flexible, so the form of the fabric can change variously, depending on a body shape and movement of the person wearing the garment. For example, when style lines such as various types of incision lines and/or sewing lines are transformed in order to reflect design elements in the 3D garment, changes should be reflected to lengths and/or areas of the 2D patterns influenced by the transformed lines in the 3D garment.

SUMMARY

Embodiments relate to modifying a design of garment by manipulating a style line representing a style or a silhouette of the garment. At least one of unchanged two-dimensional (2D) patterns or an unchanged garment including the unchanged 2D patterns is displayed. An input indicating change of the style line is received. In response, first lines in the unchanged 2D patterns or unchanged garment are identified. The first lines include a selected line in the unchanged 2D patterns corresponding to the style line and at least one additional line that is symmetrical to the selected line or sewn with the selected line in the unchanged garment. The unchanged 2D pattern or the unchanged garment is modified by changing the first lines to changed 2D patterns or a changed garment. t. The changed 2D patterns or the changed garment is displayed.

In one or more embodiments, at least one second line in the unchanged 2D patterns is identified. The at least one second line extends from a point of the first lines at which a tangential angle is equal to or more than a predetermined angle or a radius of curvature is less than a predetermined value. The unchanged 2D pattern or the unchanged garment is further modified by changing of the at least one second line according to changing of the first lines to generate the changed 2D patterns or the changed garment.

In one or more embodiments, at least one third line in the unchanged 2D patterns is identified. The at least one third line is sewn with the at least one second line in the unchanged 2D patterns. The unchanged 2D pattern or the unchanged garment is further modified by changing at least one third line according to the changing of the first lines to generate the changed 2D patterns or the changed garment.

In one or more embodiments, at least one fourth line in the unchanged 2D patterns is identified. The at least one fourth line sewn with the one of the first lines. The unchanged 2D pattern or the unchanged garment is further modified by changing of the at least one fourth line according to changing of the first lines to generate the changed 2D patterns or the changed garment.

In one or more embodiments, a candidate list including a list of candidate lines for a smooth line connected to the first lines is generated. The smooth line has a rate of tangential angle change relative to the first lines by a first threshold or a change in radii of curvature below a second threshold. One or more smooth lines of the first lines are determined from the candidate list. The unchanged 2D pattern or the unchanged garment is further modified by changing one or more smooth lines to generate the changed 2D patterns or the changed garment.

In one or more embodiments, the candidate list is generated by setting one of the first lines as a current line. A first direction from a start point where the input is received up to an end point opposite to the start point in the current line is set as a search direction. Searching is performed, in the search direction, for one or more lines in the 2D patterns connected to the current line. The searched one or more lines are added to the candidate list.

In one or more embodiments, the one or more lines are searched by searching for a first line of the current line iteratively in the first direction, and searching for a second line of the current line iteratively in a direction opposite to the first direction.

In one or more embodiments, a pilar line starting from a point of the first lines at which a tangential angle is equal to or more than a predetermined angle or a radius of curvature is less than a predetermined value is identified. The pilar line is removed from the candidate list.

In one or more embodiments, the candidate list includes at least one of a first candidate list including the first lines, a second candidate list including a second type of lines starting from a point of the first lines at which a tangential angle is equal to or more than a predetermined angle or a radius of curvature is less than a predetermined value, a third candidate list including a third type of lines sewn with the second type of lines, and a fourth candidate list including a fourth type of smooth line sewn with the first lines.

In one or more embodiments, the unchanged 2D pattern or the unchanged garment is modified by changing a segment of the selected line responsive to receiving an input indicating a point of the selected line at which a tangential angle is equal to or more than a predetermined angle or a radius of curvature is less than a predetermined value. All of the selected line is changed responsive to receiving another input indicating another point on the selected line other than the point at which the tangential angle is equal to or more than the predetermined angle or the radius of curvature is less than the predetermined value.

In one or more embodiments, changing the segment of the selected line includes changing the length of the segment to have an end at a changed location of the point.

In one or more embodiments, modifying the unchanged 2D pattern or the unchanged garment comprises changing a line connected to the selected line at the point.

In one or more embodiments, the line connected to the selected line is changed by determining a first movement value of the point in the changed 2D patterns relative to the unchanged 2D patterns. Second movement values of remaining points on the line other than the point are determined by interpolating the first movement value according to distances of the remaining points to the point. The remaining points in the line are moved according to the second movement values.

In one or more embodiments, the selected line is resized or moved translationally.

In one or more embodiments, changing a side of at least one of the unchanged 2D patterns indicated by the input and an opposite side of at least one of the unchanged 2D patterns are changed responsive to receiving the input.

In one or more embodiments, the changed 2D pattern or the changed garment are displayed in real-time with receiving of the input.

DETAILED DESCRIPTION OF EMBODIMENTS

Figure 1:
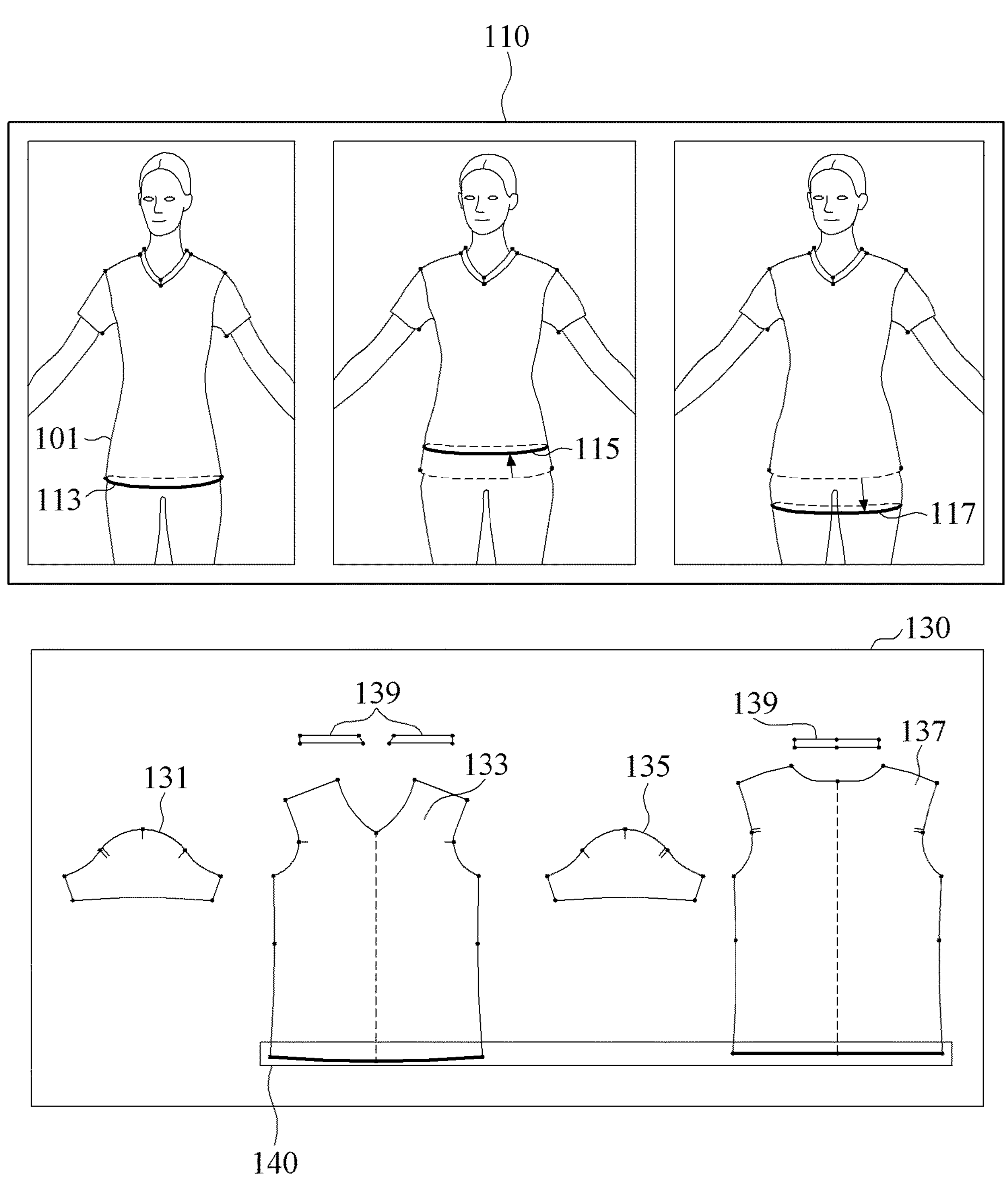
FIG. 1 is a diagram illustrating changing of a 3D garment through a user interface, according to an exemplary embodiment.

Hereinafter, exemplary embodiments will be described in detail with reference to the accompanying drawings. However, various changes may be made to the exemplary embodiments, and thus the scope of the patent application is not limited or limited by these embodiments. It should be understood that all changes, equivalents, or substitutes to the exemplary embodiments are included in the scope of the rights.

The terms used in the exemplary embodiments are used for illustrative purposes only and should not be interpreted as limiting. A singular form includes a plural form if there is no clearly opposite meaning in the context. In the present specification, it should be understood that term "include" or "have" indicates that a feature, a number, an operation, a component, a part or the combination thereof described in the specification is present, but does not exclude a possibility of presence or addition of one or more other features, numbers, operations, components, parts or combinations thereof, in advance.

If not contrarily defined, all terms used herein including technological or scientific terms have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present application.

In addition, in the description with reference to the accompanying drawings, the same components are assigned the same reference numerals regardless of the reference numerals, and redundant descriptions thereof will be omitted. In describing the exemplary embodiments, a detailed description of related known technologies will be omitted if it is determined that they unnecessarily make the gist of embodiments unclear.

Further, in describing the components of the exemplary embodiment, terms including first, second, A, B, (a), (b), and the like may be used. These terms are just intended to distinguish the components from other components, and the terms do not limit the nature, sequence, or order of the components. When it is disclosed that any component is "connected," "coupled," or "linked" to other components, it should be understood that the component may be directly connected or linked to other components, but another component may be "connected," "coupled," or "linked" between the respective components.

The component included in any one embodiment and a component including a common function will be described by using the same name in another embodiment. Unless there is an opposite description, description of any one embodiment may be applied to another embodiment, and a detailed description will be omitted in a redundant range.

FIG. 1 is a diagram for describing changing a 3D garment through a user interface in a 3D space on 2D patterns, according to an exemplary embodiment. Referring to FIG. 1, diagram 110 illustrates 3D garment 101 and diagram 130 illustrates 2D patterns 131, 133, 135, 137, and 139 corresponding to the 3D garment 101, according to an exemplary embodiment.

For example, style line 113 of the 3D garment 101 displayed in 3D space may be selected through a user interface (e.g., a user interface 1710 of FIG. 17), and then moved up as in style line 115 or moved down as in style line 117. A "style line" described herein refers to a 3D line of a 3D garment that represents the style of the 3D garment, the silhouette of the 3D garment or a combination thereof. Such style line may be embodied in 3D garment 101, for example, as a sewing line between the 2D patterns 131, 133, 135, 137, 139 constituting the 3D garment 101, an outline representing a silhouette of the 3D garment 101 or an incision line added for a style of the 3D garment 101.

A "line" refers to a 2D line of the 2D patterns that form a 3D garment.

A "candidate line" refers to a line that is a candidate for a smooth line to which changes from another line selected by a userare propagated. A candidate line of a certain line may be another line that is symmetric to the certain line or may be a line that is sewn together with the certain line. Taking the example of FIG. 1, candidate lines may include lines that connect 2D patterns 131, 133, 135, 137, 139 smoothly such as a line smoothly connecting lower ends of front and rear plate patterns of an upper garment, or a line smoothly connecting lateral surfaces of a front plate pattern and a rear plate pattern of the upper garment, and a line smoothly connecting both cross sections of a sleeve pattern.

Information on candidate lines for smooth lines connecting a plurality of patterns smoothly may be stored in a candidate line list, described below. A smooth line has a rate of tangential angle change that is equal to or below a threshold or the change of radii of curvature is equal to or below another threshold relative to another line that is being modified.

An input of changing a position of the style line 113 of the 3D garment 101 upward shown by the style line 115 or changing the position of the style line 113 downward shown by the style line 117 may be received. In response, the garment simulating apparatus changes positions of bottom lines 140 of the 2D patterns 133, 137 corresponding to the style line 113 in the 2D patterns 131, 133, 135, 137, 139 upward or downward to match the changed style lines 115, 117. When a user input of changing the style line 113 shown in the 3D garment 101 is received, the garment simulating apparatus reflects the change of the style line 113 equally to the bottom lines 140 of the 2D patterns 133, 137 corresponding to the style line 113 to display the changed style line 115 or 117 of the 3D garment 101.

When the user changes the style line 113 of the 3D garment 101 to the style line 115 or the style line 117 using the 3D interface, the garment simulating apparatus propagates the changes of the style line 115 or the style line 117 to the 2D lines 140 associated with the style line 113 to change the lengths and/or areas of the 2D patterns 133, 137 associated with the lines 140, thereby reflecting changes to the 2D patterns 131, 133, 135, 137, 139 in a natural manner. A scheme of propagating the changes of style line 113 to style line 115 or 117 is described below in detail.

When the user moves the style line 113 and/or any point on the style line 113, the garment simulating apparatus simultaneously changes lines starting from a non-smooth point (e.g., a sewing point on the lines 140) and/or lines sewn jointly with other lines starting from the non-smooth point in addition to the 2D lines 140 corresponding to the style line 113 to reflect the changes of the style line 113 to the 2D patterns 131, 133, 135, 137, 139. The non-smooth point is described below in more detail with reference to FIG. 5.

Each of the 2D patterns 131, 133, 135, 137, 139 illustrated in diagram 130 may correspond to each body part constituting the 3D garment 101 illustrated in the diagram 110. For example, a right sleeve pattern 131 may correspond to a right arm part of the 3D garment 101 and a front plate body pattern 133 may correspond to a front body part of the 3D garment 101. A left sleeve pattern 135 may correspond to a left arm part of the 3D garment 101 and a rear plate body pattern 137 may correspond to a rear surface body part of the 3D garment 101. A neck collar pattern 139 may correspond to a neck part of the 3D garment 101.

The 2D patterns 131, 133, 135, 137, 139 may be a virtual 2D pattern modeled to a set of polygons in order to simulate the 3D garment 101. The 2D patterns 131, 133, 135, 137, 139 may include a plurality of pattern pieces, and each of the plurality of pattern pieces may be modeled as a polygonal mesh based on a body shape of a 3D avatar, for example. The polygonal mesh may include the plurality of polygons (e.g., a triangle or a square).

Although not illustrated in FIG. 1, the 3D garment 101 and the 2D patterns 131, 133, 135, 137, 139 may be formed of meshes, each including a plurality of polygons. The meshes may be modeled in various manners. As an example, the vertexes of the polygons included in the mesh are points with mass (point mass), and sides of the polygon may be expressed by springs having elasticity, which connect the mass. As a result, the 3D garment 101 according to an exemplary embodiment may be modeled by a mass-spring model, for example. The springs may have each resist for stretch, shear, and bending according to a property of a used fabric. Alternatively, the mesh may be modeled to a strain model. The polygon included in the mesh may be modeled to the triangle or also modeled to polygons of the square or more, for example. In some cases, when a 3D volume should be modeled, the mesh may be modeled to a 3D polyhedron. Vertexes of the polygon(s) included in the mesh may be moved by, for example, external force such as gravity, and internal force such as stretch, shear, and bending. The garment simulating apparatus acquires force applied to each vertex by calculating the external force and the internal force to acquire a displacement speed and a motion of each vertex. The motion of the garment may be simulated through motions of the vertexes of the polygon(s) constituting the mesh in each time operation.

For example, when the 3D garment is worn on the 3D avatar, a natural 3D virtual garment based on a physical law may be implemented. The vertexes of the polygon(s) included in the mesh may move according to the action of the external force such as the gravity and the internal force such as stretch, shear, and bending. When the force applied to each vertex is acquired by calculating the external force and the internal force, the displacement and the speed of the motion of each vertex may be acquired. In addition, the motion of the virtual garment may be simulated through the motions of the vertexes of the polygon of the mesh in each time step. When the 2D pattern represented by the polygonal mesh is worn on the 3D avatar, a 3D virtual garment of a natural shape based on the physical law may be implemented.

The 3D garment 101 according to an exemplary embodiment may include at least one of a virtual garment suitable for a body size of the user, a virtual garment for a 3D virtual character, and a virtual garment for a 3D virtual avatar.

In one or more embodiments, the changes to the 2D patterns and/or the 3D garment may be displayed in real-time as the input to change a style line is received.

Figure 2:
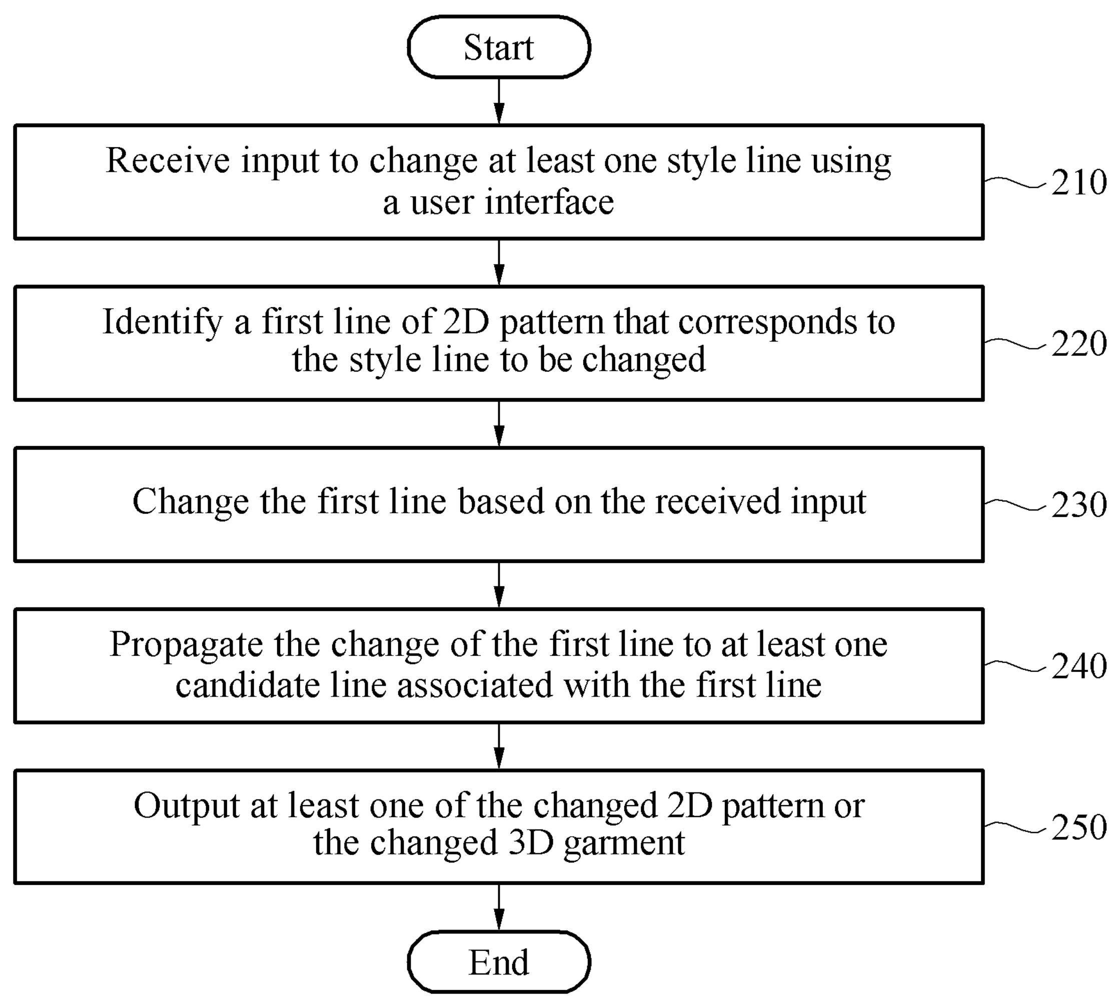
FIG. 2 is a flowchart illustrating a method of modifying a design of a garment, according to an exemplary embodiment.

FIG. 2 is a flowchart illustrating a method of simulating a garment according to an exemplary embodiment. Although operations are described as being performed in a sequential order, an order of the respective operations may be changed, and/or at least two operations may be performed in parallel.

Referring to FIG. 2, the garment simulating apparatus according to an exemplary embodiment may display a 3D garment in which the style line is changed through an operation 210 to an operation 250.

In operation 210, the garment simulating apparatus may receive an input of changing at least one style line of a plurality of style lines that collectively represent the style or the silhouette of the 3D garment using a user interface displaying the 3D garment. In this case, the input of changing the style line may be generated by selecting one point on the style line through a finger touch, a touch pen input, or a mouse click, and moving a position of the selected point to upper, lower, left, and right positions of the style line.

In operation 220, the garment simulating apparatus identifies a first line of at least one 2D pattern that corresponds to the style line to be changed. The first line described herein refers to a line of a 2D pattern that is selected by a user to modify a length or an area of a specific portion of a 3D garment. The first line of a 2D pattern corresponding to a style line may be 2D lines of 2D patterns associated with the locations of the style line being changed by the user input. The first line may be of a single line segment or may include multiple line segments.

For example, when an input of changing style line 325 on the bottom of the 3D garment 320 (shown in diagram 310 of FIG. 3 below) is received, the garment simulating apparatus may identify first lines 345, 355 connected across 2D patterns 340, 350 associated with the style line 325. In this case, the 2D patterns 340, 350, 360, 370, 380 illustrated in the diagram 330 may form the 3D garment 320 illustrated in the diagram 310. The first line 345 may be a bottom line of a front plate pattern 340 of the upper garment associated with the bottom style line 325 of the 3D garment 320, and the first line 355 may be the bottom line of a rear plate pattern 350 of the upper garment associated with the bottom style line 325 of the 3D garment 320.

In an exemplary embodiment, lines connecting the 2D patterns 340, 350, 360, 370, 380 may include, for example, first type of lines that are style lines selected by the user, second types of lines starting from the non-smooth points of the first type of lines, third type of lines sewn together with the second type of lines, and fourth type of lines sewn together with the first type of lines. The types of the lines according to an example embodiment are described in more detail below with reference to FIGS. 3 through 7.

In operation 230, the garment simulating apparatus may change the first line identified in the operation 220 based on the input received in the operation 210.

In operation 240, the garment simulating apparatus propagates the change of the first line to at least one candidate line associated with the first line to change at least one 2D pattern. A candidate line associated with the first line may include a line symmetric to the first line selected by the user and/or a line sewn together with the first line selected by the user.

The garment simulating apparatus may change or maintain a 2D pattern so that the overall shape of the 3D garment is substantially maintained or changed.

A candidate line may be (i) a second line in a second pattern symmetric to a first pattern that includes a first line where the second line is a counterpart to the first line, (ii) a third line starting from a non-smooth point of the first line or (iii) a sewing line of a third pattern connected by sewing to one of the first line, the second line and the third line. The second pattern symmetric to the first pattern may be 2D patterns corresponding to body parts symmetric to each other (e.g., a left sleeve pattern symmetric to a right sleeve pattern).

In operation 240, the garment simulating apparatus may generate a candidate list including the first line changed in operation 230 and at least one candidate line propagated with the changes of the first line. A candidate list is an ordered list of lines that are smoothly connected across a plurality of 2D patterns and may also be referred to as a smooth line list (SLL). The candidate list may include, for example, a first candidate list including a first type of lines, a second candidate list including a second type of lines starting from the non-smooth points of the first type of lines, a third candidate list including a third type of lines sewn together with the second type of lines, and a fourth candidate list including a fourth type of lines sewn together with the first type of lines. The first type of lines includes at least one of a line selected by a user, a line that is symmetrical to the selected line or a line that is sewn together with the selected line.

In operation 240, the garment simulating apparatus propagates the changes of the first line to at least one candidate line. The garment simulating apparatus may search for at least one candidate line to be changed in association with the change of the first line, and apply the change to the at least one searched candidate line. A method of searching and changing at least one candidate line is described below in more detail with reference to FIGS. 8 and 9.

In operation 240, the garment simulating apparatus may store information on the changed candidate line in the candidate list. The garment simulating apparatus may change the 2D pattern based on the candidate list. Changing at least one 2D pattern is described below in more detail with reference to FIGS. 11 through 16.

In operation 250, the garment simulating apparatus may output (e.g., display) at least one of the 2D patterns changed in operation 240 and the 3D garment changed in response to the changed 2D patterns. The changed 2D pattern or the changed 3D garment may be stored in a non-transitory storage medium.

Figure 3:
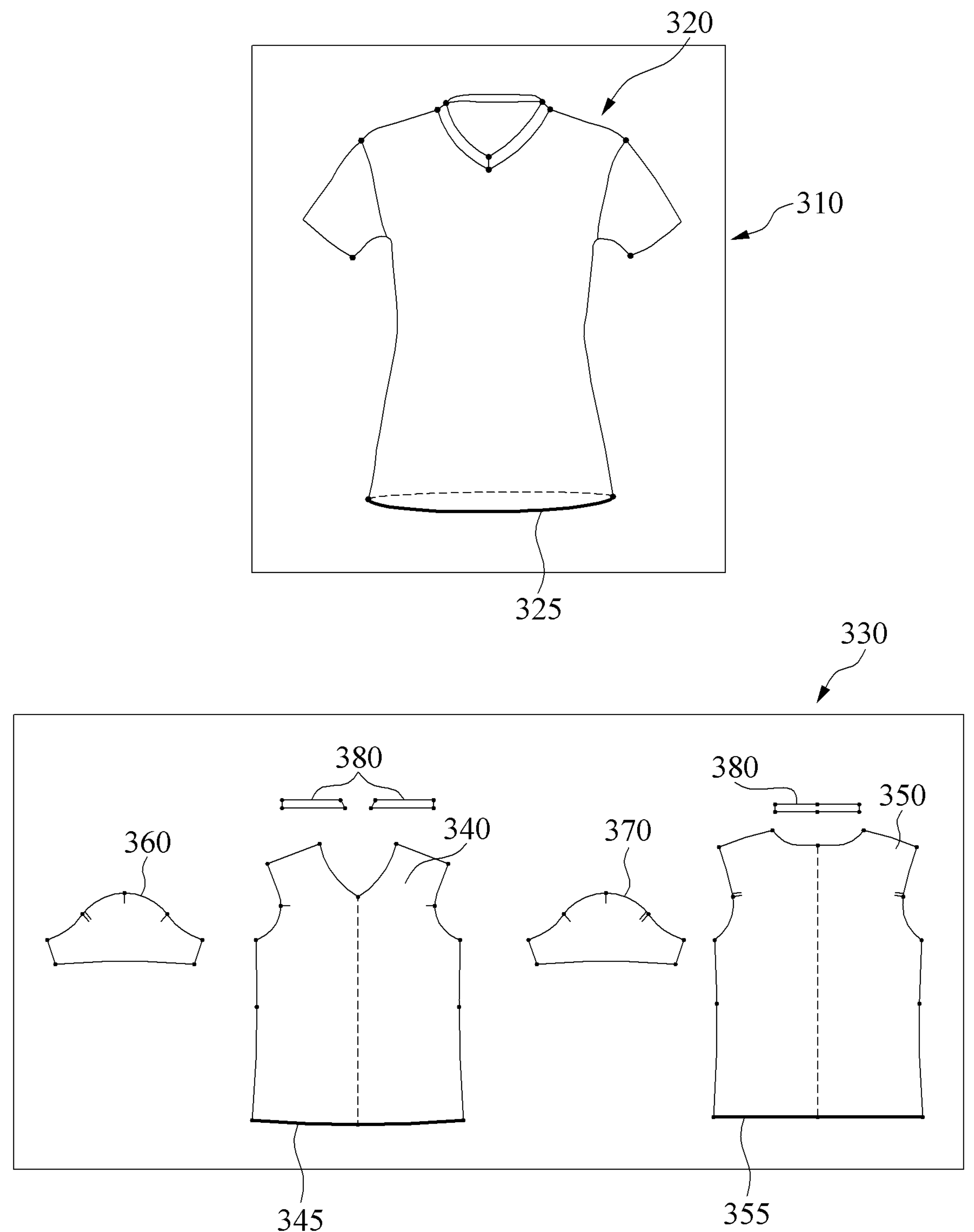
FIG. 3 is a diagram illustrating a smooth line selected by a user, according to an exemplary embodiment.

FIG. 3 is a diagram illustrating a line selected by a user, according to an exemplary embodiment. Referring to FIG. 3, diagram 310 illustrates a 3D garment 320 and diagram 330 illustrates 2D patterns 340, 350, 360, 370, 380 corresponding to the 3D garment 320.

The garment simulating apparatus may receive, for example, an input of changing the style line 325 of the 3D garment 320 illustrated in diagram 310. The garment simulating apparatus may identify the first lines 345, 355 connected throughout the 2D patterns 340, 350 and associate them with the style line 325. The first lines 345, 355 are identified from various lines included in the 2D patterns 340, 350, 360, 370, 380 in response to receiving the input of changing the style line 325. The first lines 345, 355 may be the bottom line of the front plate pattern 340 of the upper garment and the bottom line of the rear plate pattern 350 of the upper garment, respectively. These first lines 345, 355 may be associated with the bottom style line 325 of the 3D garment 320.

The user may select any one style line (e.g., style line 325) to be changed in the 3D garment 320. A line (e.g., lines 345, 355) on the 2D pattern identified in response to selection of a style line by a user may be referred to as a "first type of line." The first type of lines may also be referred to as "Picked SLL" in that the first type of lines are selected by the user. For example, when an input of moving the style line 325 upward or downward is received, the garment simulating apparatus changes the first lines 345, 355 associated with the style line 325, and propagates the corresponding changes to at least one candidate line associated with the first lines 345, 355 so that at least one 2D pattern is modified. A candidate line associated with the first line is described below in more detail with reference to FIG. 4.

Figure 4:
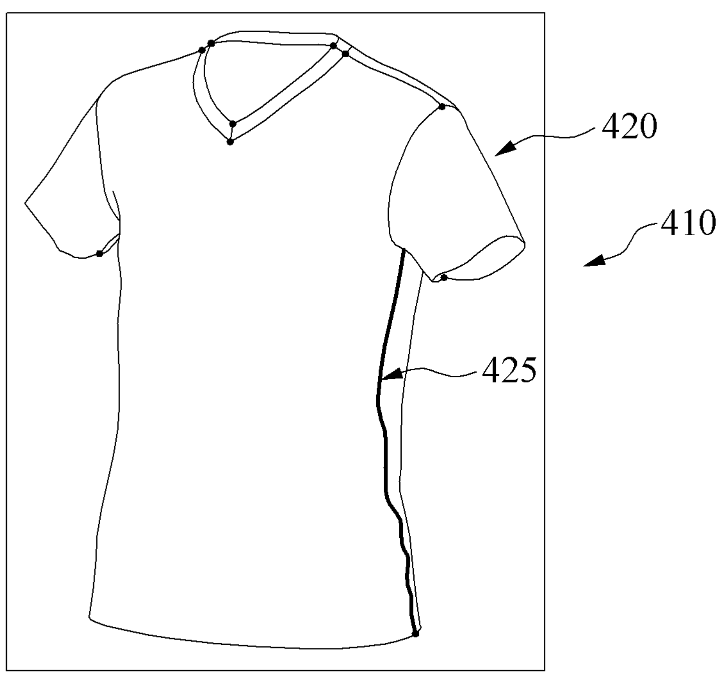
FIG. 4 is a diagram illustrating a first type of smooth lines, according to an exemplary embodiment.
Figure 4:
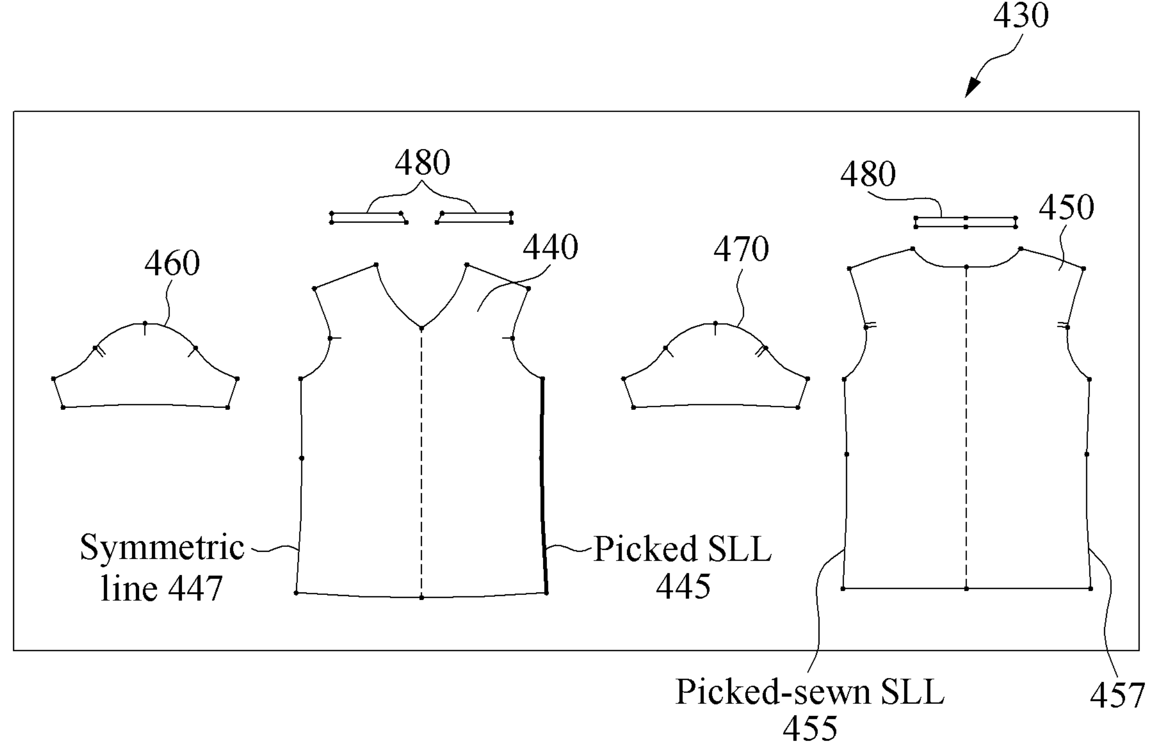

FIG. 4 is a diagram illustrating a first type of lines, according to an exemplary embodiment. Referring to FIG. 4, diagram 410 illustrates a 3D garment 420 and diagram 430 illustrates 2D patterns 440, 450, 460, 470, 480 forming the 3D garment 420.

The garment simulating apparatus may receive a selecting input for the style line 425 of the 3D garment 420 from the user. The garment simulating apparatus may identify the first line 445 corresponding to the style line 425 from the 2D patterns 440, 450, 460, 470, 480 of the 3D garment 420, as illustrated in diagram 430.

The garment simulating apparatus may change the first line 445 by reflecting the change of the style line 425, while propagating the change of the first line 445 to at least one candidate line associated with the first line 445. At least one candidate line associated with the first line 445 may include: a line 447 that is symmetric to the first line 445 in the first pattern 440, a line 455 sewn together with the first line 445, and a line 457 sewn together with the line 447. The line 457 is a second line relative to the first line 445 since the line 457 in a second pattern 450 has its location associated with first line 445 in the first piece 440 that is symmetric to the second piece 450.

As such, the line selected by the user and candidate lines associated with the user-selected line may be referred to as the "first type of lines" or "Picked SLL set." The first type of lines may be stored in a first candidate list.

Figure 5:
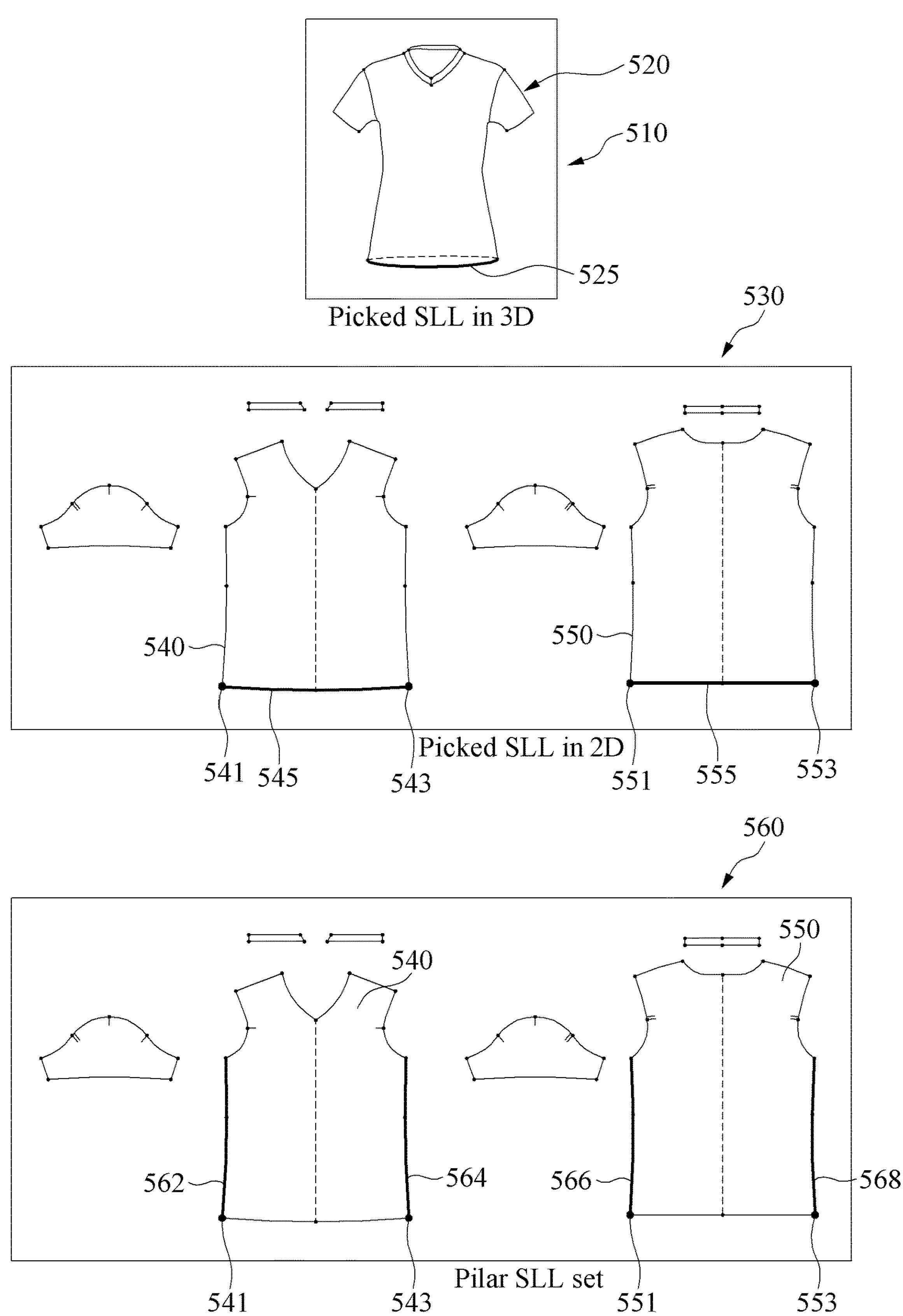
FIG. 5 is a diagram illustrating a second type of smooth lines, according to an exemplary embodiment.

FIG. 5 illustrates a second type of lines, according to an example embodiment. Referring to FIG. 5, diagram 510 illustrates a 3D garment 520, diagram 530 illustrates 2D patterns 540, 550 including lines 545, 555 corresponding to style line 525 selected by the user, and diagram 560 illustrates second type of lines 562, 564, 566, 568 starting from non-smooth points 541, 543 of the line 545 and non-smooth points 551, 553 of the line 555.

The garment simulating apparatus may receive an input of selecting of one point of the style line 525 of the 3D garment 520 by the user, as illustrated in the diagram 510. The garment simulating apparatus may identify the first lines 545, 555 connected across the 2D patterns 540, 550 and associated style line 525, as illustrated in diagram 530. Because first lines 545, 555 are selected as lines corresponding to style line 525, first lines 545, 555 are first type of lines.

The garment simulating apparatus may identify second type of lines starting from the non-smooth points 541, 543, 551, 553 of each of the first type of lines 545, 555. A non-smooth point refers to a point at which a tangential angle is equal to or more than a predetermined angle (e.g., 45 degrees or 90 degrees) or a radius of curvature at the point is less than a predetermined value. In other words, the non-smooth points 541, 543 of the first line 545 in the 2D pattern 540 illustrated in the diagram 560 may be both end points of the first line 545, which are points where the lines 562, 564 of a vertical relationship with the first line 545 meet. Further, the non-smooth points 551, 553 of the first line 555 in the 2D pattern 550 may be both end points of the first line 555. These non-smooth points 551, 553 are where the lines 566, 568 having the vertical relationship with the first line 555 meet.

The garment simulating apparatus may search for the lines 562, 564 starting from the non-smooth points 541, 543 of the first line 545 of the 2D pattern 540, respectively, and the lines 566, 568 starting from the non-smooth points 551, 553 of the first line 555 of the second pattern 550, respectively, as the second type of lines, as illustrated in diagram 560. As such, a line starting from the non-smooth point of the first type of lines may be referred to as a second type of line or a pilar line. The garment simulating apparatus may find a pilar line starting from a non-smooth point of a first type of line corresponding to a style line selected by a user.

The second type of lines starting from a non-smooth point of a line included in the first type of lines may be referred to as "pilar SLL set" herein. The second type of lines may be stored in a second candidate list.

Figure 6:
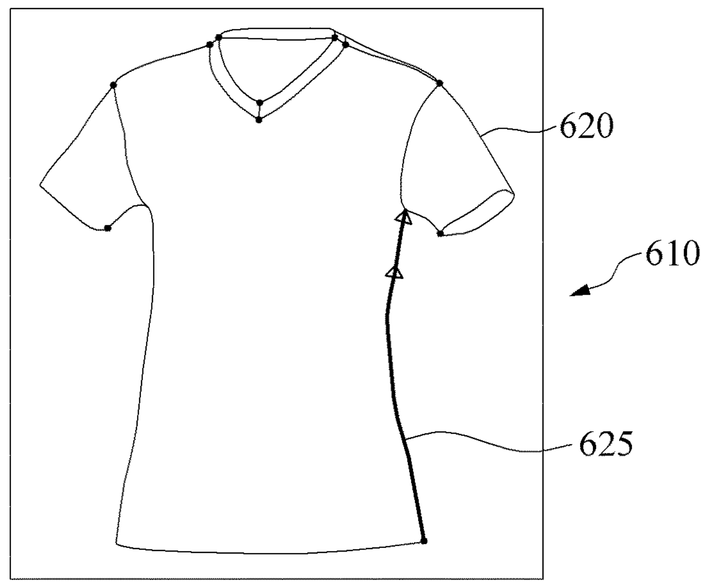
FIG. 6 is a diagram illustrating a third type of smooth lines, according to an exemplary embodiment.
Figure 6:
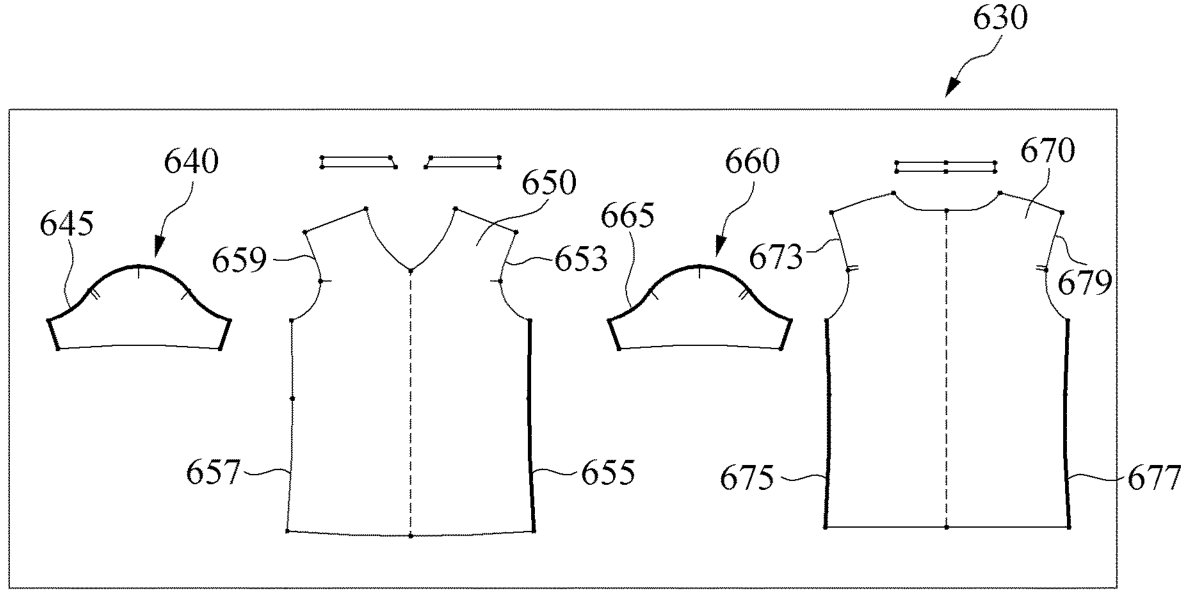

FIG. 6 is a diagram illustrating a third type of lines, according to an exemplary embodiment. Referring to FIG. 6, diagram 610 illustrates a 3D garment 620 according to an exemplary embodiment, and diagram 630 illustrates 2D patterns 640, 650, 660, 670. 2D patterns 650, 670 include first lines 655, 675 corresponding to a style line 625 of the 3D garment 620. 2D patterns 650, 670 include second lines 657, 667 that are symmetric to first lines 655, 675, and a second type of lines 653, 659, 673, 679 that start from non-smooth points of one of first lines 655, 675 or second lines 657, 677. 2D pattern 640, 660 include a third type of lines 645, 665 that are sewn with second type of lines 653, 659, 673, 679.

When an input changing the length or the position of the style line 625 of the 3D garment 620 is received, the location of style line 625 may be lengthened or shortened, which causes the lengths and/or areas of 2D patterns 650, 670 to be changed. The garment simulating apparatus identifies changes to the first lines 655, 675 connected across 2D pattern 650, 670, and propagates the changes of the first lines 655, 675 to the second lines 657, 677 symmetric to the first lines 655, 675 and/or the third type of lines 645, 665 sewn together with the second type of lines 653, 673, 659, 679 to change the 2D patterns.

The garment simulating apparatus may propagate the change according to change in the first lines 655, 675 to the third type of lines 645, 665 of the 2D patterns 640, 660 connected to second type of lines 653, 673, 659, 679. Information on the first lines 655, 675 and the third type of lines 645, 665 sewn together with the second type of lines 653, 673, 659, 679 may be included in a second candidate list.

For example, when style line 625 is selected by a user, first lines 655, 675 corresponding to style line 625 and second lines 657, 677 that are symmetric to the first lines 655, 675 may be determined as the first type of lines (i.e., picked SLL). A second type of lines 653, 673, 659, 679 starts from non-smooth points (e.g., armpit points) of the first type of lines. The second type of lines 653, 673, 659, 679 may be pilar SLL. Further, the third types of lines 645, 645 that are sewn with the second type of lines 653, 673, 659, 679 are pillar-sewn SLL. The third type of lines 645, 665 may be included in a third candidate list.

When the third type of lines 645, 665 are sewn together with the second type of lines 653, 673, 659, 679, the areas of the 2D patterns 650, 670 including the second type of lines 653, 673, 659, 679 may be changed as well.

For example, when a user selects a point on style line 625 and changes the length of the style line, the lengths of first lines 655, 675 corresponding to style line 625 may change. In this case, an area change may occur in 2D patterns 650, 670 that includes the second type of lines 653, 673 that are connected directly to first lines 655, 675 whose lengths are changed. Due to the area changes of 2D patterns 650, 670, the lengths of the second type of lines 653, 673 also changes. In such case, the length ratio of the third type of line 665 connected by sewing to the second type of lines 653, 673 may be changed by the same length ratio change as the second type of lines 653, 673. The reason for changing the length ratio of the third type of line 665 sewn to the second type of lines 653, 673 is to prevent unnecessary creases from forming due to the difference in lengths of lines that are sewn together and to retain the shape of the 3D garment to the extent possible. Accordingly, the garment simulating device may change the lengths of the third type of lines 645, 665 connected by sewing to the second type of lines 653, 673 with a same length ratio as the second type of lines 653, 673. Further, the garment simulation device may change the length ratio of the first lines 655, 675 due to the area change of the 2D patterns.

The garment simulating apparatus may calculate a change in the length ratio of the lines 655, 675 corresponding to the 2D patterns 650, 670 having their areas changed. The garment simulation apparatus may change a length ratio of the third type of lines 645, 665 sewn together with the lines corresponding to the 2D patterns 650, 670 having their areas changed based on the change of length ratio of the lines 655, 675.

Figure 7:
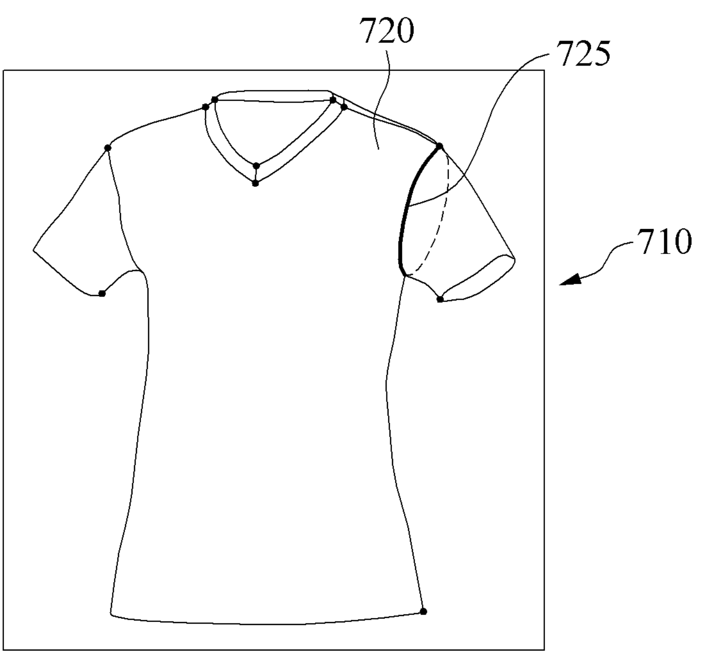
FIG. 7 is a diagram illustrating a fourth type of smooth lines, according to an exemplary embodiment.
Figure 7:
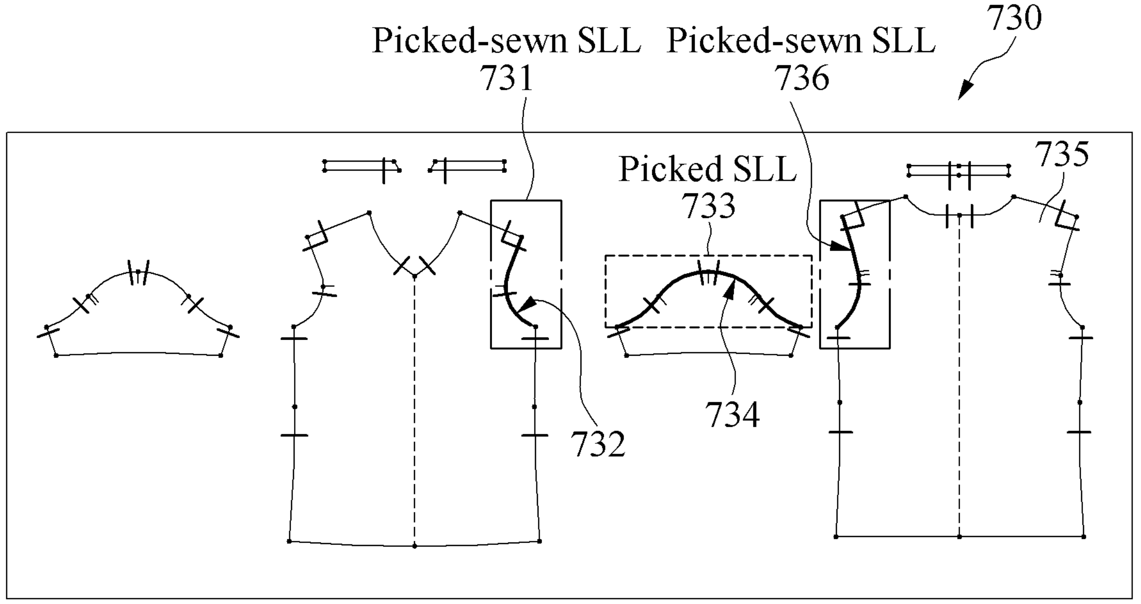

FIG. 7 is a diagram illustrating a fourth type of lines, according to an exemplary embodiment. Referring to FIG. 7, diagram 710 illustrates a 3D garment 720 according to an exemplary embodiment and diagram 730 illustrates a fourth type of lines 732, 736 sewn jointly with a first type of line 734 corresponding to a style line 725 selected by the user.

The garment simulating apparatus may receive, for example, a user input of changing the style line 725 of the 3D garment 720 illustrated in diagram 710. In response, the garment simulating apparatus may identify first line 734 corresponding to the style line 725, as illustrated in diagram 730.

When the input of changing the length or position of the style line 725 of the 3D garment 720 is received, the garment simulating apparatus may change the position and/or the length of the first line 734 according to the change of the style line 725, while propagating the change of the first line 734 to at least one candidate line associated with the style line 725. Among one or more candidate lines associated with the style line 725, for example, the first line 734 of a 2D sleeve pattern 733 corresponding to the style line 725 is the first type of line, and the line 732 of a front plate pattern 731 sewn together with the line 734 of a rear plate pattern 735 is a fourth type of lines sewn together with the first type of line. A fourth type of lines described herein refers to lines sewn with a first type of line that corresponds to a style line selected by a user. The fourth type of line may also be referred to as "picked-sewn SLL." Picked-sewn SLL may correspond to a set of lines sewn with any line included in a picked SLL set.

Figure 8:
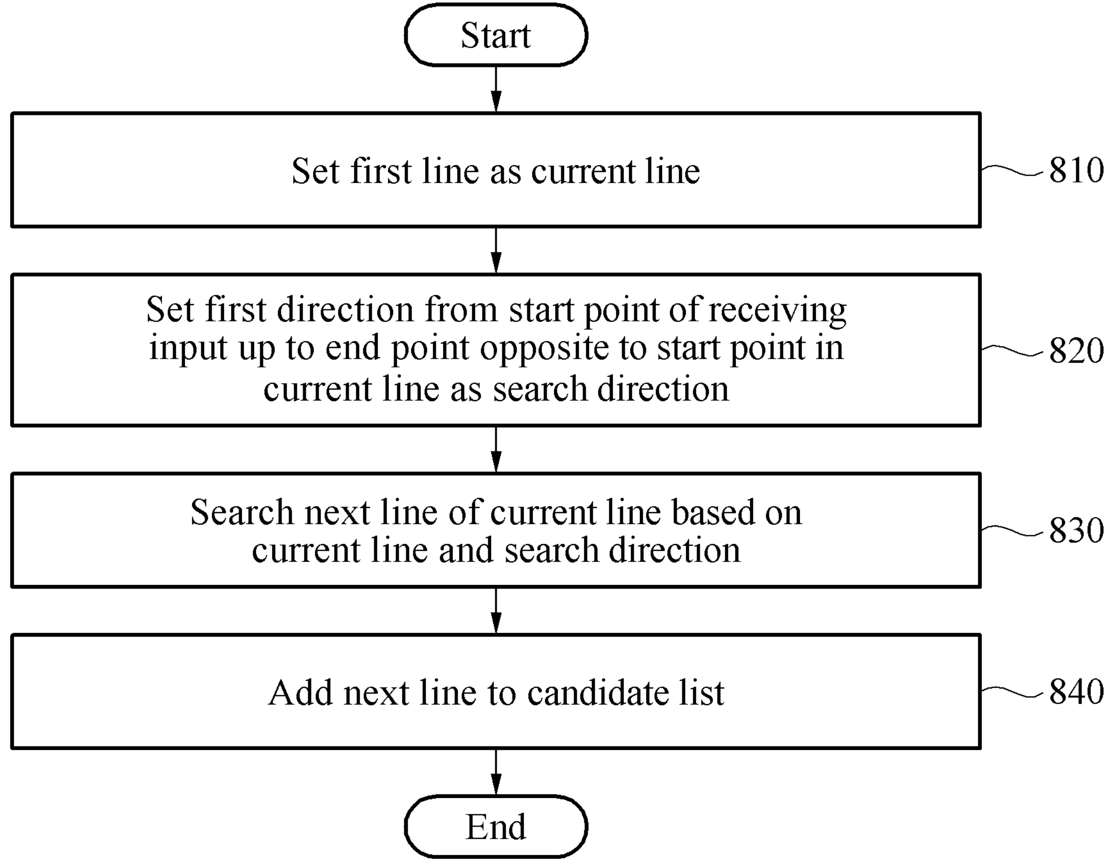
FIG. 8 is a flowchart illustrating a method for generating a smooth line list by searching of a candidate line, according to an exemplary embodiment.

FIG. 8 is a flowchart illustrating a method for generating a candidate list by searching for candidate lines, according to an exemplary embodiment. Hereinafter, in the exemplary embodiment, respective operations are illustrated as being performed in a sequential order, but variations may be made. For example, the order of the respective operations may be changed, or at least two operations may also be performed in parallel.

Referring to FIG. 8, the garment simulating apparatus according to an exemplary embodiment generates the candidate list through an operation 810 to an operation 840.

In operation 810, the garment simulating apparatus may set a first line as a current line. In operation 820, the garment simulating apparatus may set a first direction from a start point indicated by an input provided by the user to change the style line in the current line selected in operation 810 to an end point opposite to the start point as a search direction.

In operation 830, the garment simulating apparatus may search for a line extending from the current line while progressing in a search direction along the current line. To facilitate explanation, a line that extends from the current line may be identified as a "smooth line" herein. A smooth line described herein refers to a line that continues smoothly from a current line. For example, a current line L1, line L2 starting from a non-smooth point of line L1, and line L3 connected to the current line L1 by sewing may extend continuously in a smooth manner. In such a case, lines L1, L2, L3 that form a continuous line may be stored as a smooth line in a candidate list. Such candidate list may store information about each smooth line (e.g., lines L1, L2, L3).

An example of a method for searching for the next line of the current line by the garment simulating apparatus is described below. The garment simulating apparatus may set at least one of a line connected to the current line and a line connected to the current line through sewing within the 2D pattern including the current line as a candidate line for a smooth line based on the current line and the search direction. The garment simulating apparatus may determine a line continuing from the current line based on the smoothness between the corresponding candidate line and the current line. A method for determining the smoothness between the candidate line and the current line by the garment simulating apparatus is described below in more detail with reference to FIG. 9.

The garment simulating apparatus may search for the corresponding candidate line as the smooth line based on the smoothness. The garment simulating apparatus may select a line that is the most smoothly connected to the current line among the candidate lines, i.e., a line having highest smoothness as the smooth line. The smoothness may be defined in terms of the difference of the tangential angle of the smooth lines or the difference in the radii of curvature of the smooth lines. If such differences are smaller, the smoothness is determined to be higher.

In operation 840, the garment simulating apparatus may add the smooth line searched in operation 830 to the candidate list. To identify a smooth line, the garment simulating apparatus sets, as a current line, a first line selected by a user, and then reiteratively search for smooth lines that are connected to the current line, starting from a line connected to the current line and chosen from candidate lines of the current line. The garment simulating apparatus may terminate the search when no further smooth lines are found. The iterative search described herein refers to choosing and registering a line most smoothly connected to the current line among many candidate lines connected to the current line, and then proceeding to set the registered line as another current line to repeat the process.

A loop may exist while progressing along a search direction such as the counterclockwise or clockwise direction to find the smooth lines, and therefore, a line previously visited may again be visited. In one embodiment, to identify a line already visited, a visited line may be marked with a "visited" tag. When a line marked with "visited" tag is revisited, the garment simulating apparatus may terminate the algorithm for searching the smooth lines. When terminating the algorithm, the garment simulating apparatus may generate a candidate list as an ordered list storing the visited lines.

Figure 9:
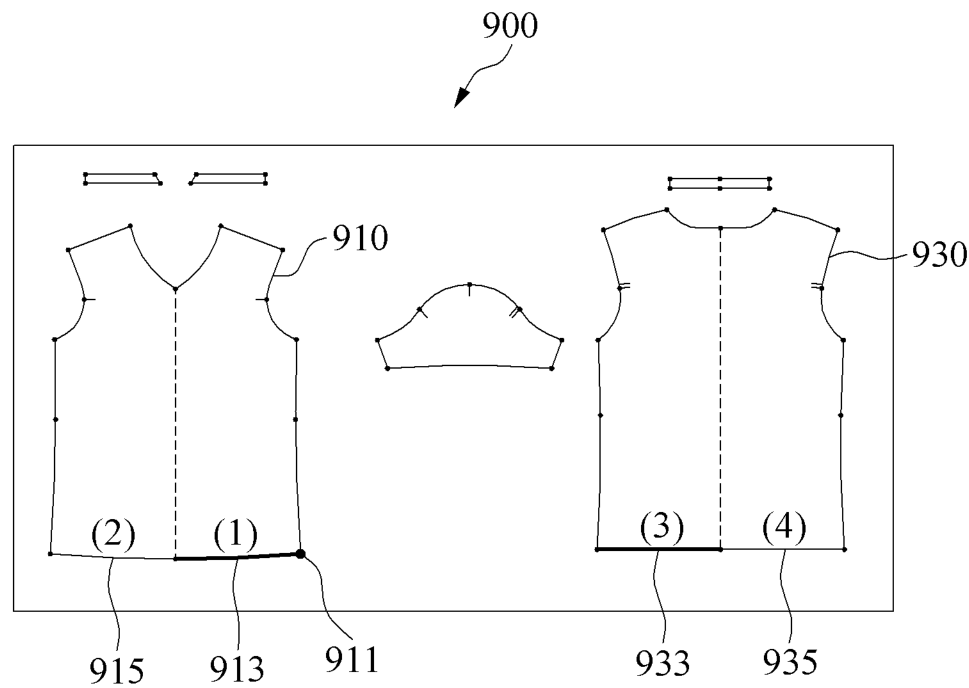
FIG. 9 is a diagram illustrating a method for generating a smooth line list, according to an exemplary embodiment.

FIG. 9 is a diagram illustrating a method for generating a candidate list, according to an exemplary embodiment. Referring to FIG. 9, diagram 900 illustrates a method for generating the candidate list by searching smooth lines among lines included in 2D patterns 910, 930, according to an exemplary embodiment.

The candidate list may include the first line modified by the user and at least one candidate line to which the change of the first line is to be propagated. For example, assuming that the point selected by the user in the 3D garment is point 911 on line 913 at a right bottom of the 2D pattern 910, the garment simulating apparatus receives an input indicating whether the start point of the line is selected or the end point is selected to output the candidate list which is an ordered list of the smooth lines 915, 933, 935 connected smoothly with the line 913 on which selected point 911 is located. When point 911 is selected as the start point of the line 913 of the 2D pattern 910, the garment simulating apparatus may tag the line 913 as visited, and set the line 913 as the current line.

The garment simulating apparatus may search for at least one candidate line that may be a smooth line relative to the current line, and store searched candidate lines as smooth lines of the current line in a candidate list. The candidate line of the current line may be, among others, (i) a second line that is symmetric with the current line, (ii) a third line that starts from a non-smooth point of the current line and (iii) a sewing line in another pattern that is connected by sewing to the current line, the second line or the third line.

When searching for the candidate line, the garment simulating apparatus may set the first direction (e.g., left direction) starting from point 911 where the input is received in the current line (e.g., line 913) to the end point at an opposite side of the current line as the search direction. The garment simulating apparatus may search for a next line (e.g., line 915) based on the current line (e.g., line 913) and the search direction, and add the searched line (e.g., line 915) as the smooth line of the current line in the candidate list.

When the line is found through a search, the garment simulating apparatus may mark searched line as "visited" and set the next line as the current line, followed by adding the current line and search line as a smooth line in the candidate list. The garment simulating apparatus may repeat such operation of searching for the smooth line of the current line in the search direction (e.g., left direction).

More specifically, a method for searching for the smooth line of the current line by the garment simulating apparatus is described below. The garment simulating apparatus may set, as the candidate line of the smooth line that continues from the current line, at least one of the lines connected to the current line in the 2D pattern 910 and sewn-connected line (e.g., line 933, 935) connected to the current line (e.g., line 913) by a common sewing line based on the current line (e.g., line 913) and the search direction (e.g., left direction). The "sewn-connected line" is described below in more detail with reference to FIG. 10.

The garment simulating apparatus may determine smoothness between the corresponding candidate line from the candidate lines (lines 933, 935), and the current line (line 913). For example, when the corresponding candidate line and the current line (line 913) are smoothly connected in the same 2D pattern, the garment simulating apparatus may determine the smoothness between the corresponding candidate line and the current line based on the tangential angle between the corresponding candidate line and the current line or a radius of curvature of the line connecting the corresponding candidate line and the current line.

Alternatively, when the corresponding candidate line (line 933) and the current line (line 913) are connected by sewing, the garment simulating apparatus may determine the smoothness between the corresponding candidate line and the current line based on the angle between the corresponding candidate line (line 933) and the current line (line 913) connected by a common sewing line or the radii of curvature of the corresponding candidate line (line 933) and the current line (line 913) connected by a common sewing line. In this case, the smoothness between a candidate line and a current line may be determined based on (i) whether the angle between the corresponding candidate line and the current line equals to or is less than a predetermined angle (e.g., 15 degrees), (ii) whether the radius of the curvature of the line connecting the corresponding candidate line and the current line is equal to or less than a predetermined value or (iii) a combination of (i) and (ii). The garment simulating apparatus may search for the corresponding candidate line (line 933) as the next smooth line based on the smoothness. The garment simulating apparatus may search for a line (e.g., line 933) (from the candidate lines for the smooth line) that is the smoothest relative to the current line, and designate such line as the smooth line.

As such, the garment simulating apparatus may search for a first smooth line of the current line (e.g., line 913) iteratively according to the first direction (left direction), and then search a second smooth line of the current line (e.g., line 913) iteratively according to the second direction (e.g., right direction) opposite to the first direction.

The garment simulating apparatus may search for the smooth line in a direction (e.g., right direction) opposite to the search direction of searching for the next line (e.g., line 915) and add the searched smooth line to the candidate list. As a result, in addition to the line 915 stored in the candidate list, the line 933 on the left bottom of the 2D pattern 930 and the line 935 on the right bottom may be sequentially stored in the candidate list. The garment simulating apparatus may terminate the operation if no next line is found.

Figure 10:
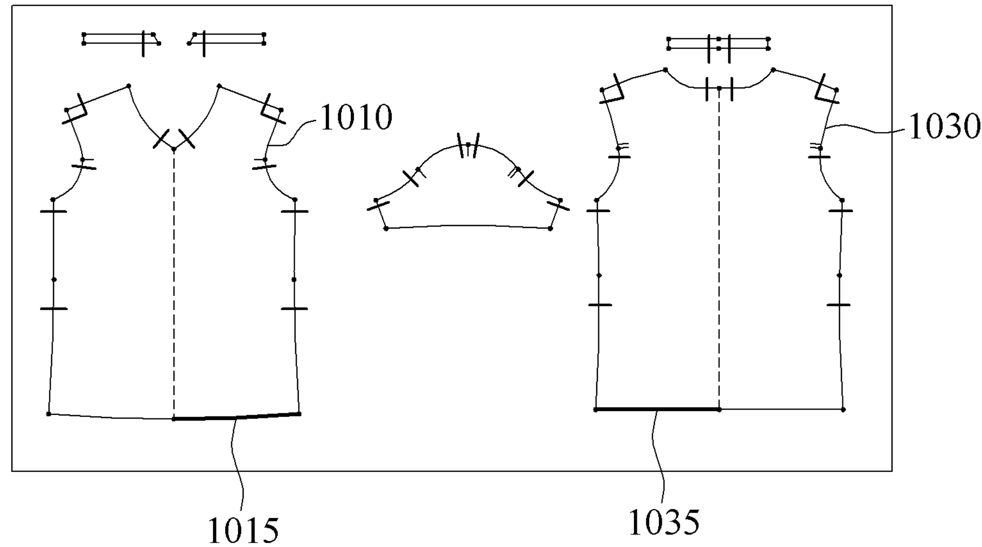
FIG. 10 is a diagram illustrating a sewn-connected line, according to an exemplary embodiment.

FIG. 10 is a diagram for describing a sewn-connected line connected through a common sewing line, according to an exemplary embodiment. Referring to FIG. 10, 2D patterns 1010, 1030 including lines 1015, 1035 are connected through a common sewing line that extends along line 1015 and line 1035. When a line (e.g., line A) and another line (e.g., line B) has a common sewing line that stretches across both lines, both lines (lines A and B) may be referred to as having a "sewn-connected" relationship. In FIG. 10, the line 1015 of the pattern 1010 and the line 1035 of the pattern 1030 share a common sewing line, and hence, these lines have a sewn-connected relationship connected.

Figure 11:
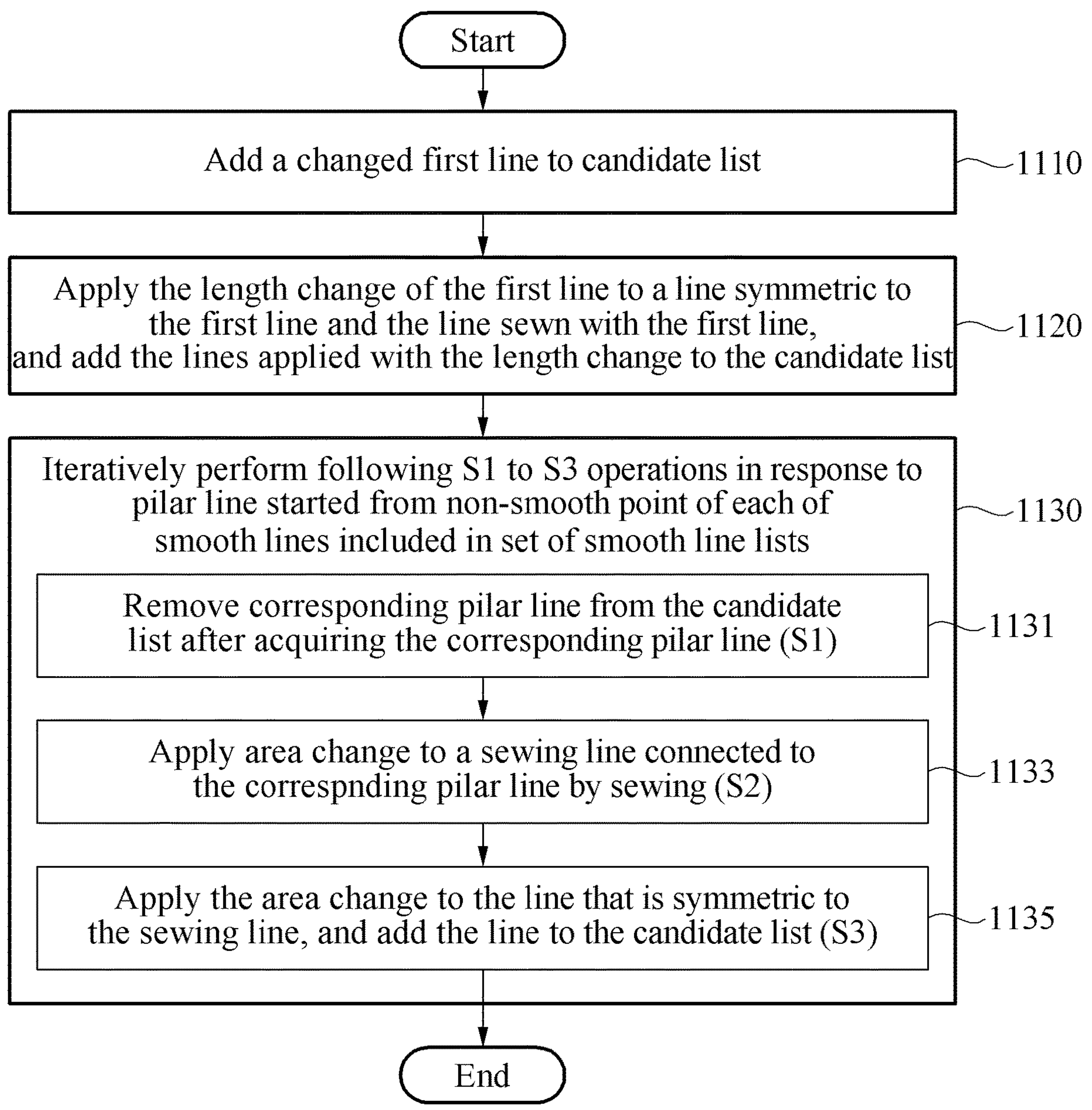
FIG. 11 is a flowchart illustrating a method for transforming at least one 2D pattern, according to an exemplary embodiment.

FIG. 11 is a flowchart illustrating a method for transforming at least one 2D pattern by a garment simulating apparatus according to an exemplary embodiment. FIG. 11 illustrate respective operations as being performed sequentially, but variations may be made. For example, the order of the respective operations may be changed or at least two operations may also be performed in parallel.

FIG. 11 illustrates a process of generating the candidate list by the garment simulating apparatus through operation 1110 to operation 1135. In operation 1110, the garment simulating apparatus may add a changed first line to the candidate list. In operation 1120, the garment simulating apparatus may apply the length change of the first line to a line symmetric to the first line and the line sewn with the first line, and add the lines applied with the length change to the candidate list.

In operation 1130, the garment simulating apparatus may perform the following operations 1131 through 1135 when a pilar line starts from a non-smooth point of a smooth line included in the candidate list.

In operation 1131, the garment simulating apparatus may remove the corresponding pilar line from the candidate list after acquiring the corresponding pilar line. Operation 1131 may be referred to as operation S1.

In operation 1133, the garment simulating apparatus may apply area change (due to change of the corresponding pilar line) to a sewing line connected to the corresponding pilar line by sewing but not yet changed. The corresponding sewing line is added to the candidate list. The operation 1133 may be referred to as operation S2.

In operation 1135, the garment simulating apparatus may apply the area change (due to the change of the corresponding pilar line) to the line that is symmetric to the sewing line, and then add the line to the candidate list. Operation 1135 may be referred to as operation S3 operation.

The garment simulating apparatus may iteratively perform the operations 1131 to 1135 until there is no pilar line remaining in the candidate list. The garment simulating apparatus may propagate the change of the smooth line until a new line is no longer searched by repeating the operations in the order of Picked SLL→Pilar SLL→Pilar-Sewn SLL.

As such, the garment simulating apparatus propagates the change of the first line to at least one candidate line associated with the first line based on the candidate list to change the length and/or area of the 2D pattern. A method in which the garment simulating apparatus changes the length/area of the 2D pattern is described below in more detail with reference to FIGS. 12A through 15B.

Figure 12A:
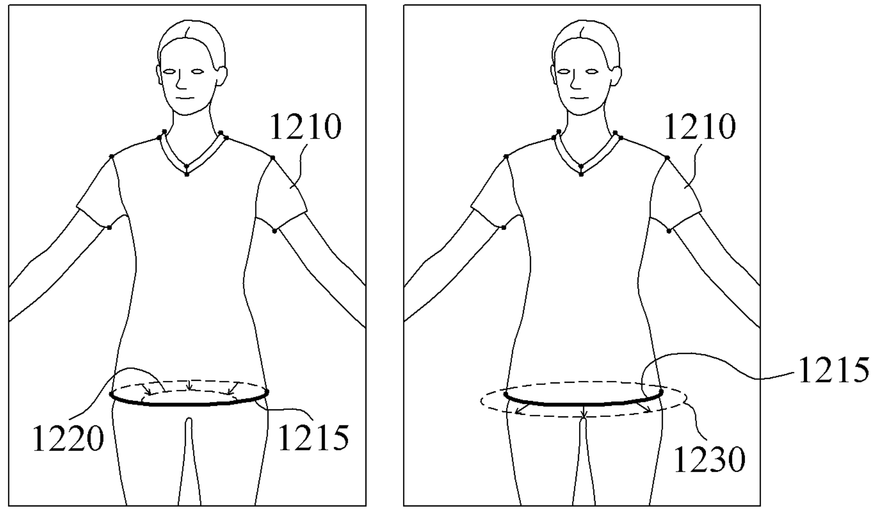
FIGS. 12A and 12B are diagrams illustrating a transformation direction, according to an exemplary embodiment.
Figure 12B:
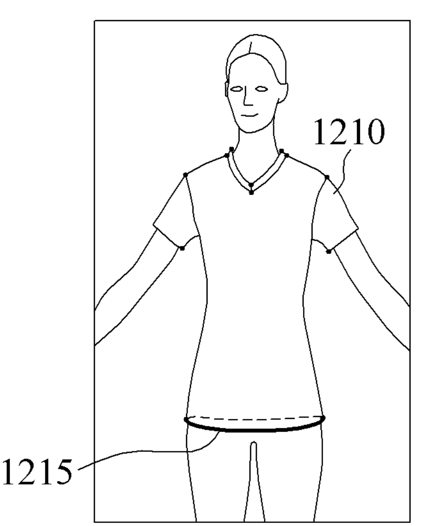
Figure 12B:
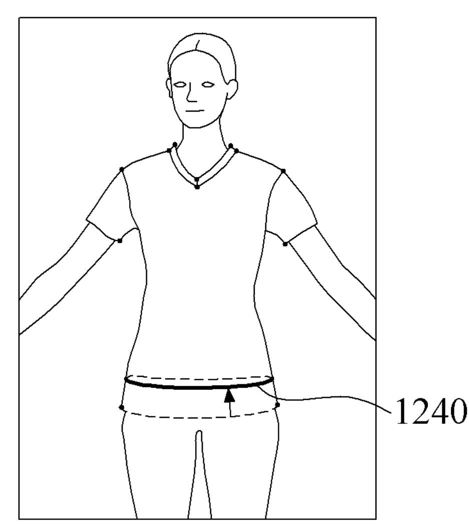
Figure 12B:
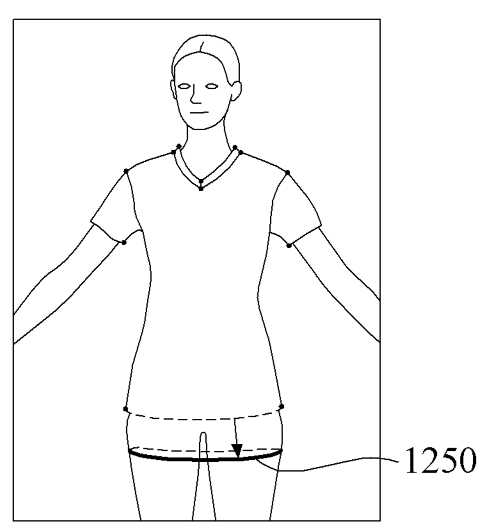

FIGS. 12A and 12B are diagrams for describing a direction of change, according to an exemplary embodiment. As described above, the garment simulating apparatus propagates the change of the smooth line to the candidate lines associated with the smooth line in accordance with the candidate list to change at least one of the lengths and the area of the 2D pattern.

The garment simulating apparatus may propagate the length change for the first type of lines included in the first candidate list to at least one candidate line associated with the first type of lines. The garment simulating apparatus may propagate the area change due to the change of the second type of lines starting from a non-smooth point of the first type of lines to at least one candidate line associated with the second type of lines. Alternatively, the garment simulating apparatus may propagate the length change of the third type of lines sewn together with the second type of lines to at least one candidate line associated with the third type of lines.

Referring to FIG. 12A, the diagram illustrates changing a 3D garment 1210 by resizing (e.g., changing in a tangential direction) a style line 1215 in a horizontally inward direction 1220 or a horizontally outward direction 1230. The garment simulating apparatus may change the appearance of the 2D pattern according to the input. Lengths of bottom parts of a front plate 2D pattern and a rear plate 2D pattern corresponding to the style line 1215 may be changed according to the change in the style line 1215. As a result, the tightness or looseness of the bottom parts of the front plate 2D and the rear plate 2D pattern may be modified.

FIG. 12B illustrates a case where the 2D pattern is changed by moving a style line 1215 of a 3D garment 1210 in a direction orthogonal to the style line 1215, e.g., an upward direction 1240 or a downward direction 1250, the garment simulating apparatus may change the 2D pattern according to the input in the normal direction orthogonal to the first line. The garment simulating apparatus regards the second type of lines starting from the non-smooth point of the first type of lines. The first type of lines includes at least one line selected by the user, the line symmetric to the selected line, and the line sewn together with the selected line. Areas of the front plate 2D pattern and the rear plate 2D pattern corresponding to the style line 1215 may be changed according to the length change in the normal direction orthogonal to the style line 1215.

When the length change in the normal direction occurs, the garment simulating apparatus may regard pilar SLL set as picked SLL set and change the length. The method of propagating the changes may be applied equally to the case of changing the 2D pattern in the tangential direction as shown in FIG. 12A, and the case of changing the 2D pattern in the normal direction as shown in FIG. 12B.

Figure 13A:
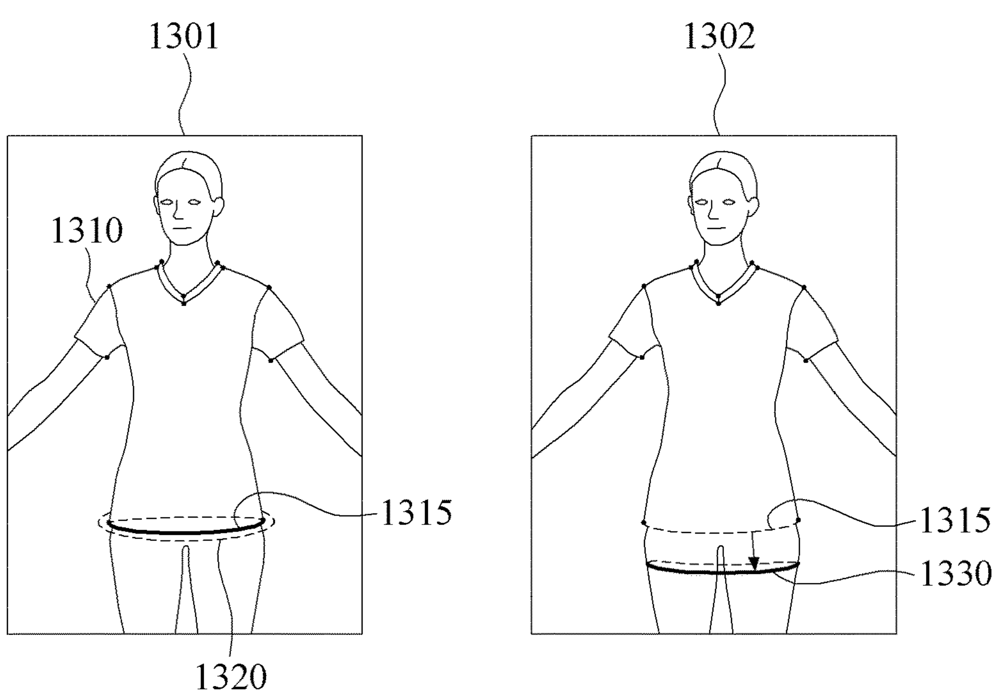
FIGS. 13A and 13B are diagrams illustrating a method for fully changing smooth lines and partially changing smooth lines, according to an exemplary embodiment.
Figure 13B:
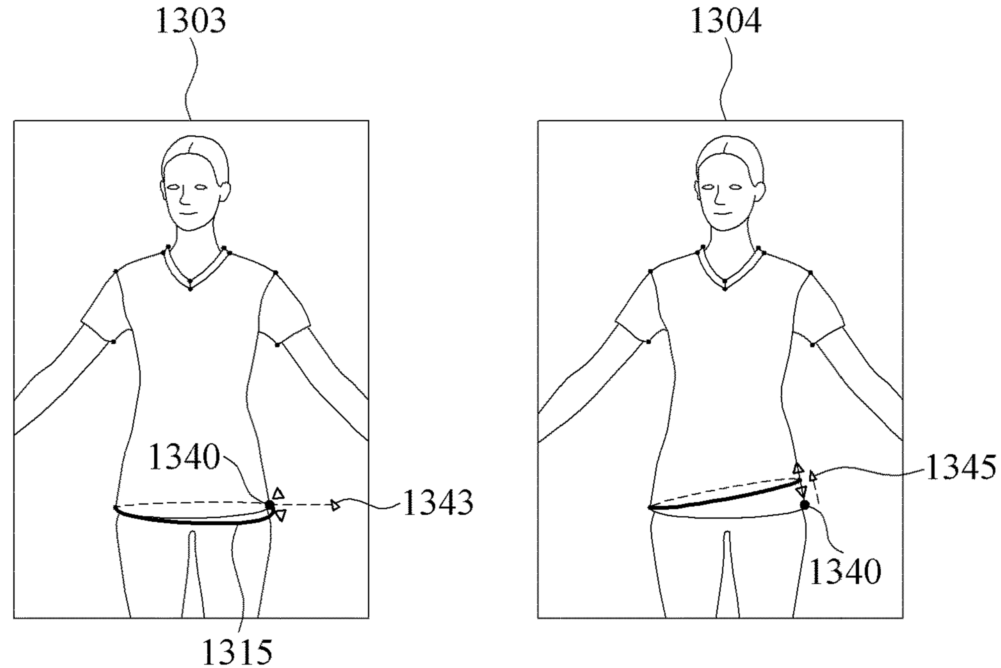

FIGS. 13A and 13B illustrate a method for changing all smooth lines and a method for changing some of the smooth lines, according to an exemplary embodiment. Referring to FIG. 13A, diagrams 1301 and 1302 illustrates an exemplary embodiment in which the smooth lines associated with style line 1315 are all transformed when any point on the style line 1315 is selected. For example, when a user input indicates changes to the style line 1315 at a point (i.e., a smooth point) on the style line 1315 other than non-smooth points at both ends of the style line 1315, a line corresponding to the selected point on the 2D pattern may be selected. When the input of transforming the style line 1315 is generated at the smooth point of the first smooth line, the garment simulating apparatus may change all smooth lines in the 2D patterns associated with the style line 1315.

The garment simulating apparatus may change all smooth lines associated with the input when horizontal transformation occurs at the smooth point of the style line 1315 to be modified into style line 1320 (illustrated in diagram 1301) or vertical transformation occurs at the smooth point of the style line 1315 to be modified into style line 1330 (illustrated in diagram 1302). That is, the user may pick any position other than both ends of the style line 1315 of the 3D garment 1310 to change all smooth lines corresponding to the style line 1315 as shown by modified style lines 1320, 1330.

Referring to FIG. 13B, diagrams 1303, 1304 illustrate an exemplary embodiment in which some of the smooth lines are changed when a non-smooth point 1340 of the style line 1315 is selected in the 3D garment. When a user input indicates the non-smooth point 1340 (e.g., a sewing point) on the style line 1315 to affect a change in the 3D garment, the garment simulating apparatus may change some of the smooth lines associated with the style line 1315. A user input may indicate a non-smooth point when the corresponding input is received at a non-smooth point (e.g., point 1340) or at a point within a distance from the non-smooth point.

When a change in left and right horizontal direction 1343 occurs in the non-smooth point 1340 of the style line 1315 as illustrated in the diagram 1303 or movement in upward or downward direction 1345 occurs in the non-smooth point 1340 of the style line 1315 as illustrated in the diagram 1304, the garment simulating apparatus may change some of the smooth lines according to the corresponding input in the 2D patterns (i.e., a subset of smooth lines that include the non-smooth point 1340) while keeping the remaining smooth lines intact. In other words, the user may pick the non-smooth point 1340 on the style line 1315 of the 3D garment 1310 to affect changes in some of the smooth lines associated with the style line 1315.

Figure 14A:
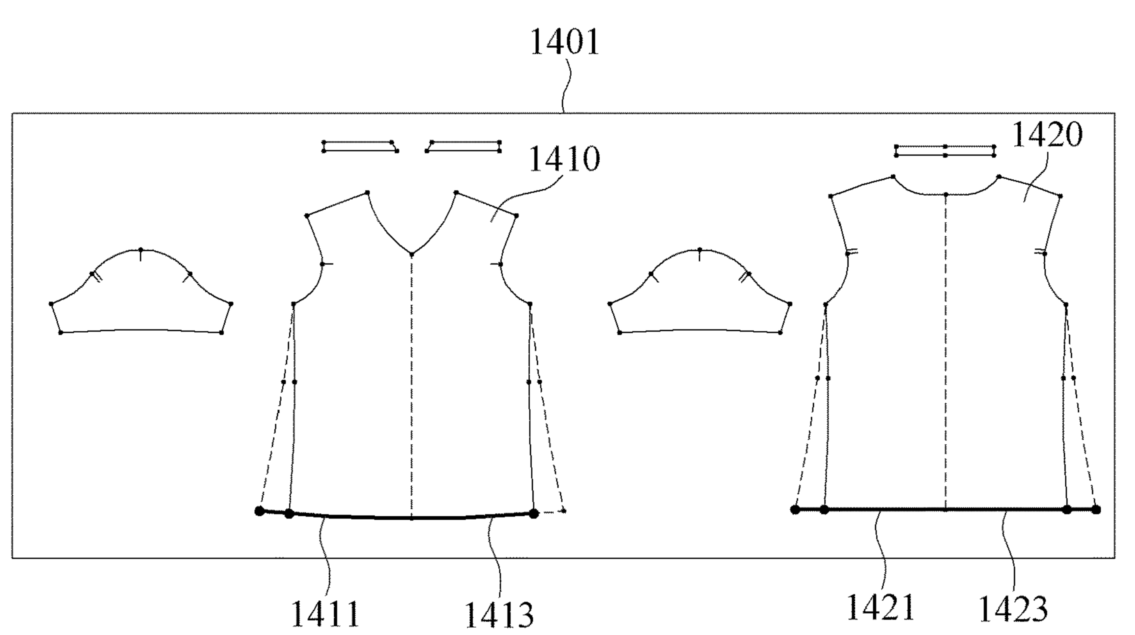
FIGS. 14A and 14B are diagrams illustrating a method for changing lengths of all smooth lines corresponding to an input, and changing lengths of part of smooth lines, according to an exemplary embodiment.
Figure 14B:
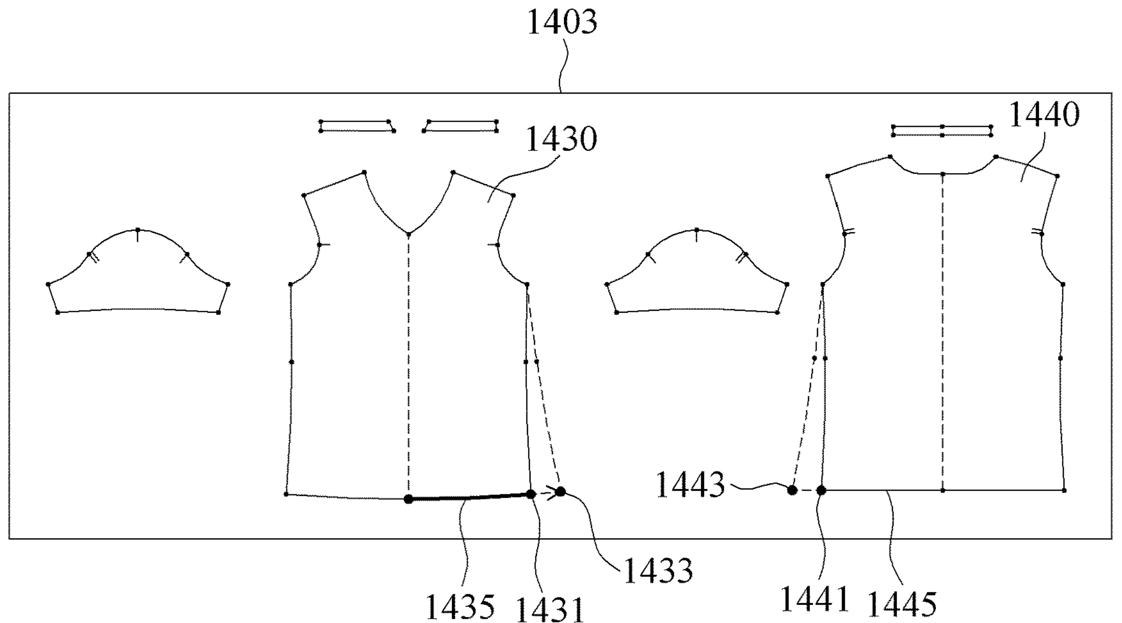

FIGS. 14A and 14B are diagrams illustrating a method for changing lengths of all smooth lines according to an input and a method for transforming lengths of some of the smooth lines, according to an exemplary embodiment. Referring to FIG. 14A, diagram 1401 illustrates an exemplary embodiment of changing the lengths of all smooth lines 1411, 1413, 1421, 1423 of 2D patterns 1410, 1420 according to the input of changing the style line of the 3D garment, according to an exemplary embodiment. For example, when the user input is received at a point other than the non-smooth point on the smooth line as illustrated in the diagram 1301 or the diagram 1303 of FIG. 13A, the garment simulating apparatus may modify all of the smooth lines 1411, 1413, 1421, 1423 of the 2D patterns 1410, 1420 according to the input by the same length ratio. In such case, the garment simulating apparatus may change lengths of all of candidate lines (e.g., the smooth line 1413 which is the next line linked with the smooth line 1411, the smooth line 1423 corresponding to the smooth line 1411 in the 2D pattern 1420 symmetric to the 2D pattern 1410 including the smooth line 1411, and the smooth line 1421 connected to the smooth line 1413 by sewing) associated with the smooth line 1411 by the same length ratio as the changed smooth line 1411.

Referring to FIG. 14B, diagram 1403 illustrates an exemplary embodiment of changing lengths of some smooth lines of the 2D patterns 1430, 1440 corresponding to the input of changing the style line of the 3D garment, according to an exemplary embodiment. When the user input is received at the non-smooth point such as the sewing point on the smooth line, as illustrated in the diagram 1303 or the diagram 1304 of FIG. 13B, the garment simulating apparatus may change some smooth lines in the 2D pattern according to the input.

The garment simulating apparatus may segment the smooth lines corresponding to the user input into 2D pattern unit segments (e.g., segment 1435), and decrease or increase the length of the segment 1435 identified by the selection point (e.g., non-smooth point 1431).

The garment simulating apparatus may divide the smooth line into the 2D pattern unit segments based on the non-smooth point of the smooth line, and change the length of the segment by the length corresponding to the changed position of the non-smooth point in the segment including the non-smooth point. For example, an input of changing the non-smooth point 1431 of the 2D pattern 1430 to a location 1433 by the user may be received. In response, the garment simulating apparatus may extend the segment 1435 so the non-smooth point ends at the changed location 1433.

The garment simulating apparatus may also change the segment 1445 of the 2D pattern 1440 sewn together with the segment 1435 of the 2D pattern 1430 in a manner similar to the segment 1435. The garment simulating apparatus may change the length of the segment 1445 by the length corresponding to the changed position 1443 of the non-smooth point 1441 in the segment 1445. The changed length of the segment 1445 may be equal to the changed length of the segment 1435.

Figure 15A:
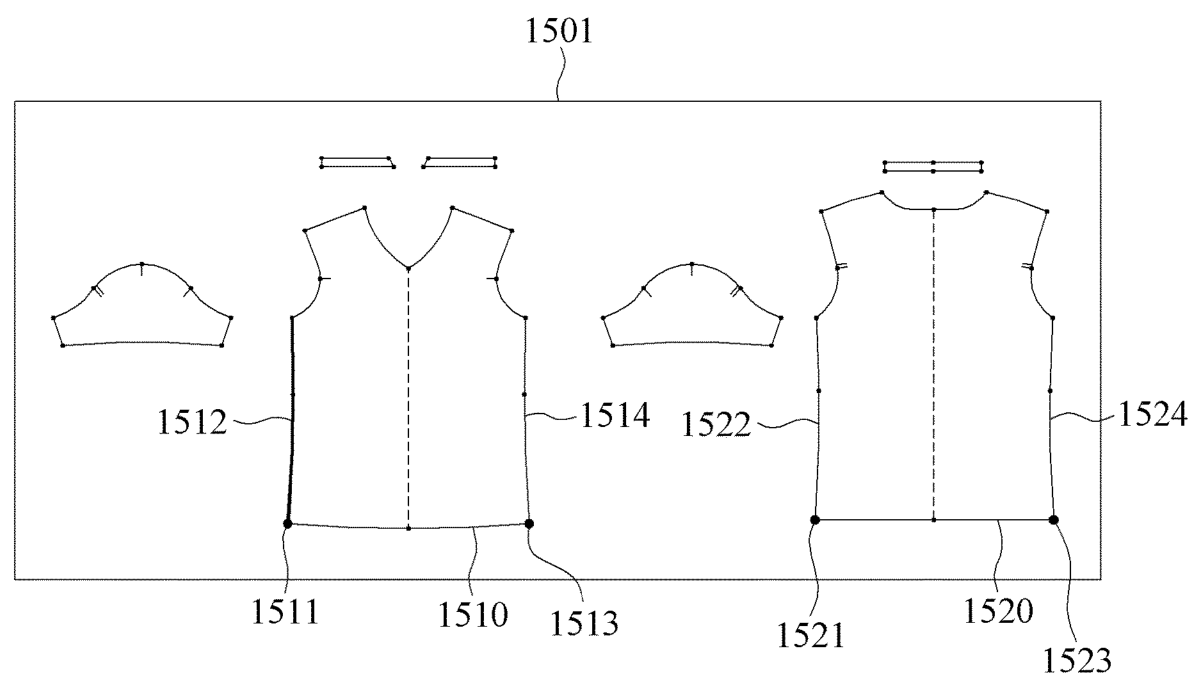
FIGS. 15A and 15B are diagrams illustrating a method for changing an entire area corresponding to smooth lines and changing a partial area, according to an exemplary embodiment.
Figure 15B:
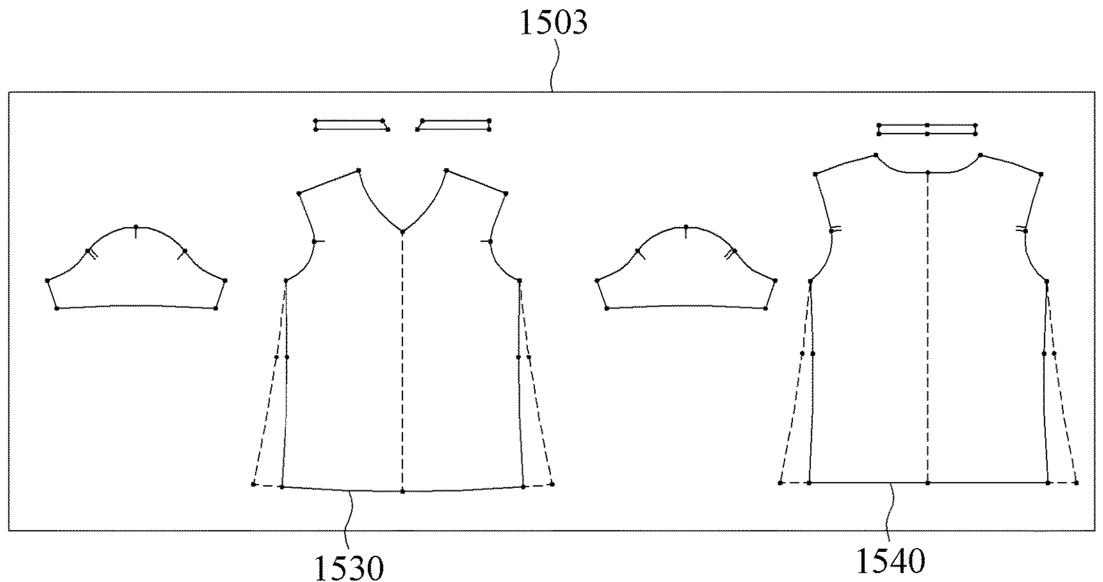

FIGS. 15A and 15B are diagrams illustrating a method for changing an area of a 2D pattern, according to an exemplary embodiment. Referring to FIG. 15A, a diagram 1501 illustrates first type of lines 1510, 1520 and second type of lines (e.g., pilar lines) 1512, 1514, 1522, 1524 starting from non-smooth points 1511, 1513, 1521, 1523 of the lines 1510, 1520. Referring to FIG. 15B, diagram 1503 illustrates lines 1530, 1540 in which the lengths of the lines 1510, 1520 illustrated in FIG. 15A and an area of a 2D pattern including the lines 1530, 1540 are changed according to the length change of the lines 1530, 1540.

In FIG. 15A, when the lengths of lines 1510, 1520 change as a result of the user input, the bottom ends of the pilar lines 1512, 1514, 1522, 1524 may also transition to new locations. When the locations of the pilar lines 1512, 1514, 1522, 1524 are changed, the area of the 2D pattern may be changed, as illustrated in FIG. 15B. The garment simulating apparatus may calculate movement values of points on pilar lines 1512, 1514, 1522, 1524 meeting the first type of lines. The garment simulating apparatus may interpolate changed locations of remaining points of the pilar lines 1512, 1514, 1522, 1524 (points on the pilar lines 1512, 1514, 1522, 1524 other than the points that meet the first type of lines) depending on the distance from the non-smooth points.

More specifically, the garment simulating apparatus may calculate the first movement values of the first points (e.g., non-smooth points 1511, 1513, 1521, 1523) of the pilar lines 1512, 1514, 1522, 1524 meeting the first type of lines 1510, 1520. The garment simulating apparatus may calculate the second movement values of the remaining second points on the second type of lines other than the first points by moving the remaining second points by a distance that is proportional to the distances of the second points from the first points. The garment simulating apparatus may change the area of the 2D pattern according to the first position movement values and the second position movement values.

Figure 16A:
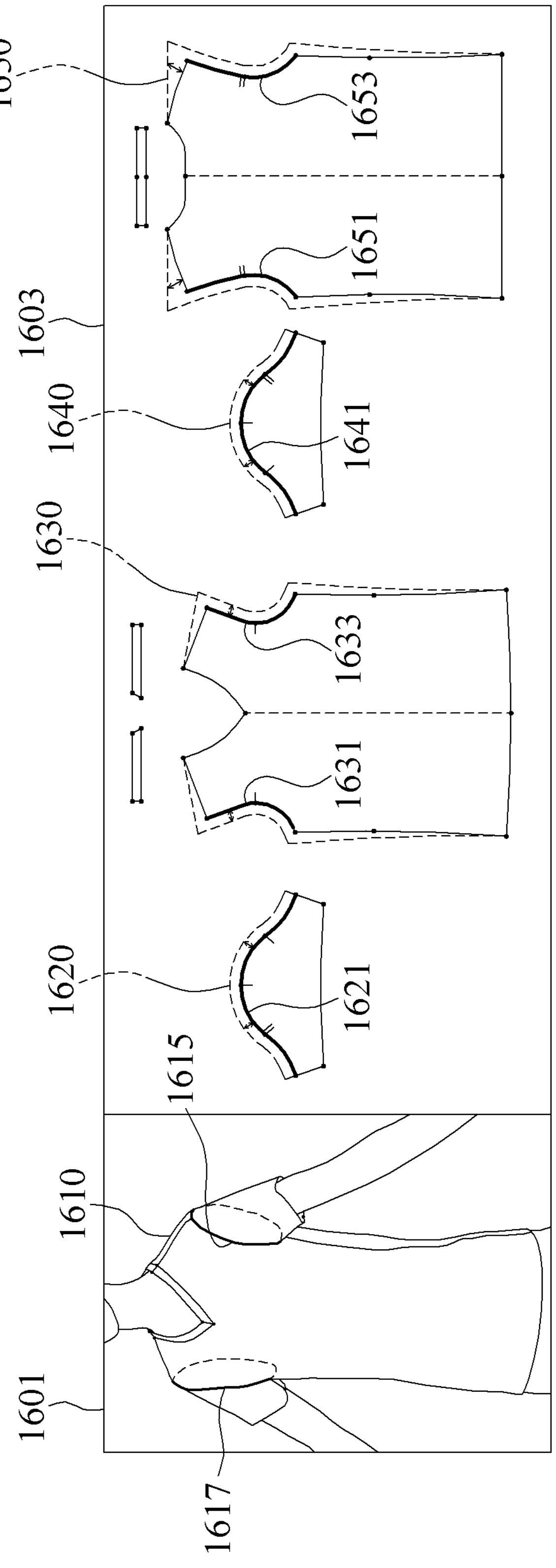
FIGS. 16A and 16B are diagrams illustrating a method for changing both sides of a 2D pattern corresponding to smooth lines and a method for changing a single side, according to an exemplary embodiment.
Figure 16B:
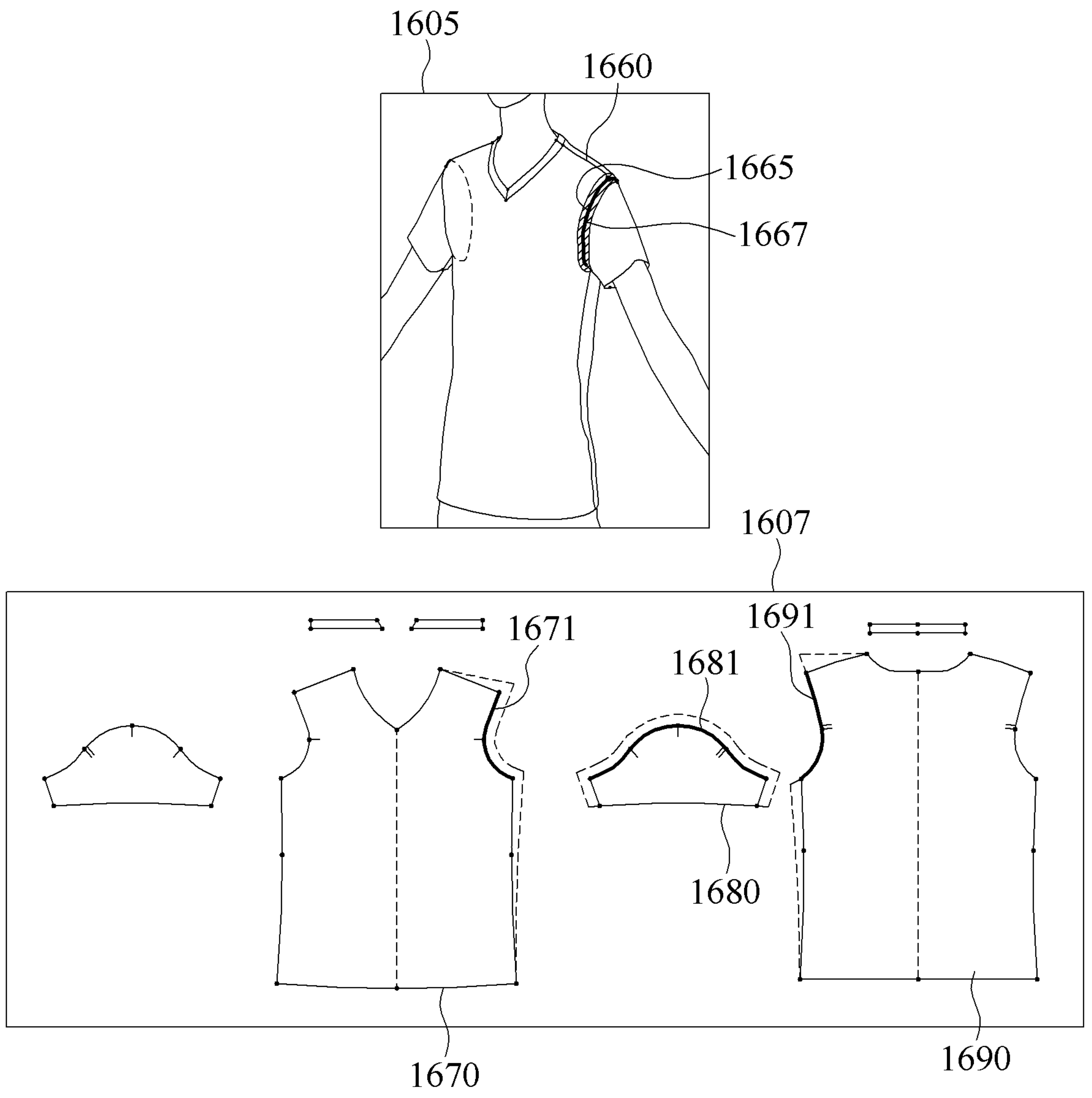

FIGS. 16A and 16B are diagrams illustrating changing both sides of a 2D pattern and changing a single side of the 2D pattern, according to an exemplary embodiment. Referring to FIG. 16A, diagram 1601 illustrates a 3D garment 1610 and diagram 1603 illustrates changing both corresponding sleeve patterns 1620, 1640.

When a first user input (e.g., click and drag of mouse) is received on a sleeve line 1615, the garment simulating apparatus may move the sleeve line 1615 and a sleeve line 1617 at an opposite side while propagating change to both patterns. That is, when the first user input is received on the sleeve line 1617, the garment simulating apparatus may change a side (e.g., a left sleeve part) where the input is received (i.e., 2D patterns 1620, 1630, 1640, and 1650) and the opposite side (e.g., a right sleeve part) jointly. The garment simulating apparatus may change line 1641 of the left sleeve part selected by the user, line 1621 of the right sleeve part symmetric to the selected line 1641, lines 1633, 1651 sewn together with the selected line 1641, and lines 1631, 1653 sewn together with line 1621.

Referring to FIG. 16B, diagram 1605 illustrates a 3D garment 1660 and diagram 1607 illustrates 2D patterns 1670, 1680, 1690 corresponding to the 3D garment 1660, according to an exemplary embodiment.

When a second user input (e.g., keyboard command along with a click-and-drag operation) is received on the sleeve line 1665, the garment simulating apparatus may modify the sleeve line 1665 only at the selected side without affecting a change at the opposite side. That is, when the second user input indicates selection of style line 1665, the garment simulating apparatus may modify only the first type of lines associated with style line 1665 but no other lines. In this case, the first type of lines include line 1671 corresponding the style line 1665 selected by the user, and lines 1681, 1691 sewn together with the line 1671.

The use of style lines enable modification to 3D garment design even without in-depth knowledge or expertise in garment designing. Various modifications to the 3D garment by the style lines may be automatically propagated to effectuate the changes in the 3D garment design. Hence, the user may refer to user interface screens showing 2D patterns less frequently, and thereby, increase the overall efficiency of designing the 3D garment. The reduced frequency of showing the 2D patterns leads to reduced use of the resources (e.g., processor time or memory) by the garment simulating apparatus.

Figure 17:
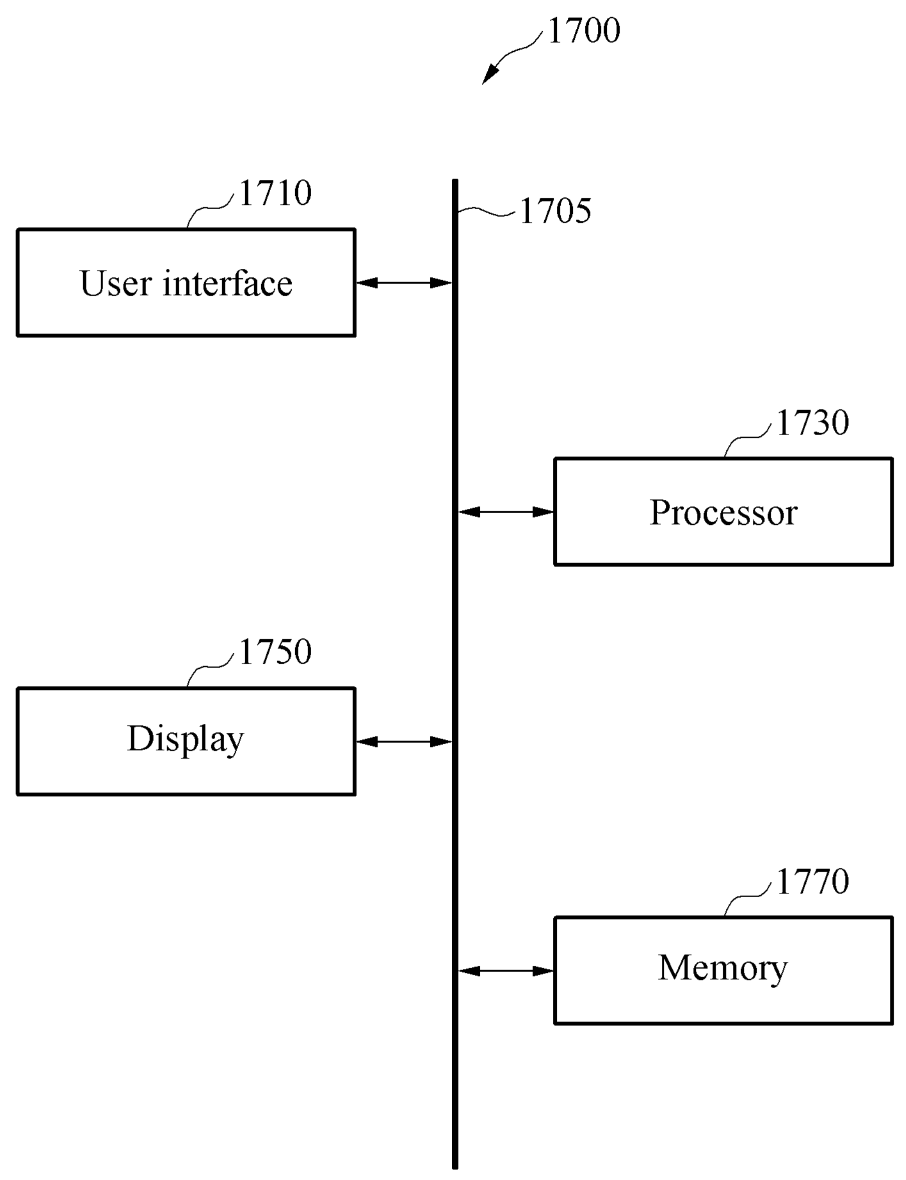
FIG. 17 is a block diagram of an apparatus of simulating a garment according to an exemplary embodiment.

FIG. 17 is a block diagram of an apparatus of simulating a garment according to an exemplary embodiment. Referring to FIG. 17, a garment simulating apparatus 1700 according to an exemplary embodiment may include a user interface 1710, a processor 1730, a display 1750, and a memory 1770. The user interface 1710, the processor 1730, the display 1750, and the memory 1770 may be connected to each other through a communication bus 1705.

The user interface 1710 displays a 3D garment. The user interface 1710 receives an input of changing at least one style line of a plurality of style lines expressing a style of the 3D garment. The user interface 1710 may receive a user input for the 3D garment displayed in the 3D space through a stylus pen or a mouse click, for example.

The processor 1730 identifies the smooth line corresponding to the style line among the smooth lines linked throughout the 2D patterns corresponding to the 3D garment displayed through the user interface 1710. The processor 1730 transforms the smooth line based on the input received through the user interface 1710. The processor 1730 propagates the transformation of the smooth line to candidate lines associated with the smooth line to transform the 2D patterns. The processor 1730 may perform a simulation based on the transformed 2D patterns.

The display 1750 may output at least one of the 2D patterns transformed by the processor 1730 and a 3D garment in which the style line is transformed in response to the 2D patterns transformed by the processor 1730. The display 1750 may display the 3D garment in which the style line is changed in the user interface through the simulation of the processor 1730.

The memory 1770 may store a movement position of the input of changing the style line received through the user interface 1710. The memory 1770 may store the smooth line identified by the processor 1730, the transformed smooth line, and/or the transformed 2D patterns. The memory 1770 may store the transformed 2D patterns in response to the 3D garment in which the style line is changed. Further, the memory 1770 may store a smooth line list generated by the processor 1730.

Besides, the memory 1770 may store various information generated in a processing process of the processor 1730. Besides, the memory 1770 may store various data and programs. The memory 1770 may include a volatile memory or a non-volatile memory. The memory 1770 may include a large-capacity storage medium such as a hard disk, to store various data.

Further, the processor 1730 may perform at least one method or an algorithm corresponding to at least one method described above through FIGS. 1 to 16B. The processor 1730 may be a data processing apparatus implemented by hardware having a circuit with a physical structure for executing desired operations. For example, the desired operations may include codes or instructions included in the program. The processor 1730 may be constituted by, for example, a central processing unit (CPU), a graphics processing unit (GPU), or a neural network processing unit (NPU). For example, the garment simulating apparatus 1700 implemented by the hardware may include a microprocessor, a central processing unit, a processor core, a multi-core processor, a multiprocessor, an Application-Specific Integrated Circuit (ASIC), and a Field Programmable Gate Array (FPGA).

The processor 1730 may execute the program and control the garment simulating apparatus 1700. A program code executed by the processor 1730 may be stored in the memory 1770.

The method according to an exemplary embodiment may be implemented in a form of a program command which may be performed through various computer means and recorded in the computer readable medium. The computer readable medium may include a program command, a data file, a data structure, etc., alone or in combination. The program command recorded in the medium may be specially designed and configured for the exemplary embodiment, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code generated by a compiler. The hardware device may be configured to be operated with one or more software modules in order to perform the operation of the exemplary embodiment, and vice versa.

The software may include a computer program, code, instructions, or a combination of one or more thereof, and configure the processing unit to operate as desired, or instruct a processing device independently or collectively. Software and/or data may be interpreted by the processing device or may be permanently or temporarily embodied in any type of machine, component, physical device, virtual equipment, computer storage medium or device in order to provide instructions or data to the processing device. The software may be distributed on a computer system connected through the network and stored or executed by a distributed method. The software and the data may be stored in one or more computer readable recording media.

What is claimed is:

1. A method of simulating a garment, the method comprising:

displaying at least one of unchanged two-dimensional (2D) patterns or an unchanged garment including the unchanged 2D patterns;

receiving selection of a style line representing a style or a silhouette of the unchanged garment displayed in a three-dimensional form;

receiving an input that changes the style line in response to receiving the selection of the style line;

in response to the change of the style line, identifying first lines in the unchanged 2D patterns or unchanged garment, the first lines including a selected line in the unchanged 2D patterns corresponding to the style line and at least one additional line that is symmetrical to the selected line or sewn with the selected line in the unchanged garment;

modifying at least one of the unchanged 2D patterns or the unchanged garment by changing the first lines to generate changed 2D patterns or a changed garment; and displaying the changed 2D patterns or the changed garment.

2. The method of claim 1, further comprising identifying at least one second line in the unchanged 2D patterns, the at least one second line extending from a non-smooth point of the first lines, wherein the at least one of the unchanged 2D patterns or the unchanged garment is further modified by changing of the at least one second line propagated from changing of the first lines to generate the changed 2D patterns or the changed garment.

3. The method of claim 2, further comprising identifying at least one third line in the unchanged 2D patterns, the at least one third line sewn with the at least one second line in the unchanged 2D patterns, wherein the at least one of the unchanged 2D patterns or the unchanged garment is further modified by changing of the at least one third line propagated from changing of the first lines to generate the changed 2D patterns or the changed garment.

4. The method of claim 1, further comprising:

generating a candidate list including a list of candidate lines connected to the first lines; and determining one or more smooth lines of the candidate lines from the candidate list, wherein each of the one or more smooth lines continue smoothly from the first lines, wherein the at least one of the unchanged 2D patterns or the unchanged garment is further modified by changing of the one or more smooth lines to generate the changed 2D patterns or the changed garment.

5. The method of claim 4, wherein the generating of the candidate list comprises:

setting one of the first lines as a current line, setting a first direction from a start point where the input is received up to an end point opposite to the start point in the current line as a search direction, searching, in the search direction, for the one or more smooth lines connected to the current line, and adding the searched one or more smooth lines to the candidate list.

6. The method of claim 5, wherein the searching for the one or more smooth lines includes:

searching for a first one of the one or more smooth lines iteratively in the first direction, and searching for a second one of the one or more smooth lines iteratively in a direction opposite to the first direction.

7. The method of claim 4, further comprising:

identifying a pilar line starting from a point of the first lines at which a tangential angle is equal to or more than a predetermined angle or a radius of curvature is less than a predetermined value, and removing the pilar line from the candidate list.

8. The method of claim 4, wherein the candidate list includes at least one of:

a first candidate list including the first lines, a second candidate list including at least one second line in the at least one unchanged 2D patterns, the at least one second line extending from a non-smooth point of the first lines, and a third candidate list including at least one third line sewn with the at least one second line.

9. The method of claim 4, wherein the modifying of the at least one of the unchanged 2D patterns or the unchanged garment comprises:

changing a segment of the selected line responsive to receiving an input indicating a point of the selected line at which a tangential angle is equal to or more than a predetermined angle or a radius of curvature is less than a predetermined value, or changing all of the selected line responsive to receiving another input indicating another point on the selected line other than the point at which the tangential angle is equal to or more than the predetermined angle or the radius of curvature is less than the predetermined value.

10. The method of claim 9, wherein the changing of the segment of the selected line includes changing a length of the segment to have an end at a changed location of the point.

11. The method of claim 9, wherein the modifying of the at least one of the unchanged 2D patterns or the unchanged garment comprises changing a connect line connected to the selected line at the point.

12. The method of claim 11, wherein the connect line is changed by:

determining a first movement value of the point in the changed 2D patterns relative to the unchanged 2D patterns, determining second movement values of remaining points on the connect line other than the point by interpolating the first movement value according to distances of the remaining points to the point, and moving the remaining points in the connect line according to the second movement values.

13. The method of claim 1, wherein the modifying of the at least one unchanged 2D patterns or the unchanged garment comprises resizing the selected line or making a translational movement of the selected line.

14. The method of claim 1, wherein the modifying of the at least one unchanged 2D patterns or the unchanged garment comprises changing a side of at least one of the unchanged 2D patterns indicated by the input and an opposite side of at least one of the unchanged 2D patterns responsive to receiving the input.

15. The method of claim 1, wherein the displaying of the changed 2D patterns or the changed garment is performed in real-time with receiving of the input.

16. A non-transitory computer readable storage medium storing instructions thereon, the instructions when executed by a processor cause the processor to:

display at least one of unchanged two-dimensional (2D) patterns or an unchanged garment including the unchanged 2D patterns;

receive selection of a style line representing a style or a silhouette of the unchanged garment displayed in a three-dimensional form;

receive an input that changes the style line in response to receiving the selection of the style line;

in response to the change of the style line, identify first lines in the unchanged 2D patterns or unchanged garment, the first lines including a selected line in the unchanged 2D patterns corresponding to the style line and at least one additional line that is symmetrical to the selected line or sewn with the selected line in the unchanged garment;

modify at least one of the unchanged 2D patterns or the unchanged garment by changing the first lines to generate changed 2D patterns or a changed garment; and display the changed 2D patterns or the changed garment.

17. The non-transitory computer readable storage medium of claim 16, further storing instructions that cause the processor to:

generate a candidate list including a list of candidate lines connected to the first lines; and determine one or more smooth lines of the candidate lines from the candidate list, wherein each of the one or more smooth lines continue smoothly from the first lines, wherein the at least one of the unchanged 2D patterns or the unchanged garment is further modified by changing of the one or more smooth lines to generate the changed 2D patterns or the changed garment.

18. The non-transitory computer readable storage medium of claim 16, further storing instructions that cause the processor to display the changed 2D patterns or the changed garment in real-time with receiving of the input.

19. A non-transitory computer readable storage medium storing a digital representation of a garment, the digital representation generated by:

displaying at least one of unchanged two-dimensional (2D) patterns or an unchanged version of the garment including the unchanged 2D patterns;

receiving selection of a style line representing a style or a silhouette of the unchanged version of the garment displayed in a three-dimensional form;

receiving an input that changes the style line in response to receiving the selection of the style line;

in response to the change of the style line, identifying lines in the unchanged 2D patterns or unchanged version of the garment, the lines including a selected line in the unchanged 2D patterns corresponding to the style line and at least one additional line that is symmetrical to the selected line or sewn with the selected line in the unchanged version of the garment; and modifying at least one of the unchanged 2D patterns or the unchanged version of the garment by changing the lines to generate changed 2D patterns or a changed version of the garment.

* * * * *